United States Patent [19]

Holt

[11] Patent Number: 5,772,116
[45] Date of Patent: Jun. 30, 1998

[54] RECIRCULATING PAINT SYSTEM HAVING AN IMPROVED SPRAY GUN

[76] Inventor: Earl R. Holt, 3738 Cherrywood Ct., Rochester Hills, Mich. 48309

[21] Appl. No.: 659,635

[22] Filed: Jun. 6, 1996

Related U.S. Application Data

[63] Continuation-in-part of Ser. No. 503,979, Jul. 19, 1995, which is a continuation-in-part of Ser. No. 161,825, Dec. 2, 1993, Pat. No. 5,501,397.

[51] Int. Cl.[6] .................................................. F16L 37/28
[52] U.S. Cl. ..................... 239/124; 239/290; 239/581.1; 239/600; 239/575; 251/149.6; 251/315.13
[58] Field of Search ............................ 239/525, 526, 239/124–127, 588, 290, 296–300, 569, 575, 581.1, 600, DIG. 19; 251/149.6, 315.1, 315.13, 316

[56] References Cited

U.S. PATENT DOCUMENTS

| | | |
|---|---|---|
| 1,133,320 | 3/1915 | Rockwood . |
| 1,489,310 | 4/1924 | Critchlow . |
| 1,732,897 | 10/1929 | Kobash . |
| 1,794,955 | 3/1931 | Gordon . |
| 1,812,922 | 7/1931 | Branson et al. ............... 239/528 X |
| 2,513,081 | 6/1950 | Clark et al. . |
| 2,548,528 | 4/1951 | Hansen . |
| 2,807,502 | 9/1957 | Tharp . |
| 3,083,725 | 4/1963 | Moen . |
| 3,104,088 | 9/1963 | Cator . |
| 3,106,346 | 10/1963 | Thomas ............................. 239/450 X |
| 3,230,964 | 1/1966 | Debrotnic et al. . |
| 3,312,243 | 4/1967 | Booker . |
| 3,515,355 | 6/1970 | Wagner . |
| 3,537,652 | 11/1970 | Pearl ................................. 239/588 |
| 3,538,950 | 11/1970 | Porteners . |
| 3,606,168 | 9/1971 | Seaman, Jr. . |
| 3,606,170 | 9/1971 | Hoffman et al. . |
| 3,712,336 | 1/1973 | Bell . |
| 3,720,373 | 3/1973 | Levey ................................. 239/127 |
| 3,743,188 | 7/1973 | Wagner ............................ 239/575 |
| 4,106,699 | 8/1978 | Holt . |
| 4,114,853 | 9/1978 | Medvick . |
| 4,442,003 | 4/1984 | Holt . |
| 4,573,498 | 3/1986 | Ludwig . |
| 4,583,711 | 4/1986 | Johnson . |
| 4,643,336 | 2/1987 | Mandeville et al. . |
| 4,747,626 | 5/1988 | Hama et al. . |
| 4,760,956 | 8/1988 | Mansfield . |
| 4,825,897 | 5/1989 | Shade . |
| 4,895,395 | 1/1990 | Ceriani . |
| 4,911,203 | 3/1990 | Garms . |
| 4,979,765 | 12/1990 | Bartholomew . |

(List continued on next page.)

FOREIGN PATENT DOCUMENTS

| 39 22 863.0-51 | 10/1990 | Germany . |
|---|---|---|
| 4135664 | 5/1992 | Japan . |
| 818818 | 8/1959 | United Kingdom . |

OTHER PUBLICATIONS

AccuSpray, Inc., *Operation And Care Manual Series 12 Low Pressure Spray Gun*, Copyright 1992, pp. 10–11, 16–17.

Graco Inc., *High Efficiency Low Pressure HVLP Spray Gun*, Copyright 1991, pp. 1–16.

*Primary Examiner*—Kevin Weldon
*Attorney, Agent, or Firm*—Harness, Dickey & Pierce, P.L.C.

[57] ABSTRACT

A recirculating paint supply system supplies single or multiple paint coatings to paint spray stations arranged in parallel or series relation, each station including manually operated flexible monoline and coaxial conduits to supply paint to an improved spray gun. In one aspect of the invention, the improved spray gun is comprised of a polymeric material to reduce the overall weight of the spray gun thereby reducing operating fatigue and ailments caused by the use of conventional spray guns. In another aspect, the improved spray gun includes larger air passages which provides for a greater volume of air to pass through the spray gun, thereby providing increased atomization of the liquid coating composition. Thus, the reduced weight, as well as the increased atomization, increases the overall finish quality of the object being painted.

31 Claims, 16 Drawing Sheets

U.S. PATENT DOCUMENTS

| | | | |
|---|---|---|---|
| 5,060,861 | 10/1991 | Holt | 239/124 |
| 5,078,322 | 1/1992 | Tortore | 238/296 X |
| 5,143,409 | 9/1992 | Lalikos . | |
| 5,180,104 | 1/1993 | Mellette . | |
| 5,195,680 | 3/1993 | Holt . | |
| 5,236,129 | 8/1993 | Grime et al. | 239/528 |
| 5,248,168 | 9/1993 | Chicester et al. . | |
| 5,286,068 | 2/1994 | Wiebe . | |
| 5,291,298 | 3/1994 | Keith et al. | 144/371 |
| 5,295,626 | 3/1994 | Mirabito . | |
| 5,395,054 | 3/1995 | Wheeler | 239/526 |
| 5,501,397 | 3/1996 | Holt . | |

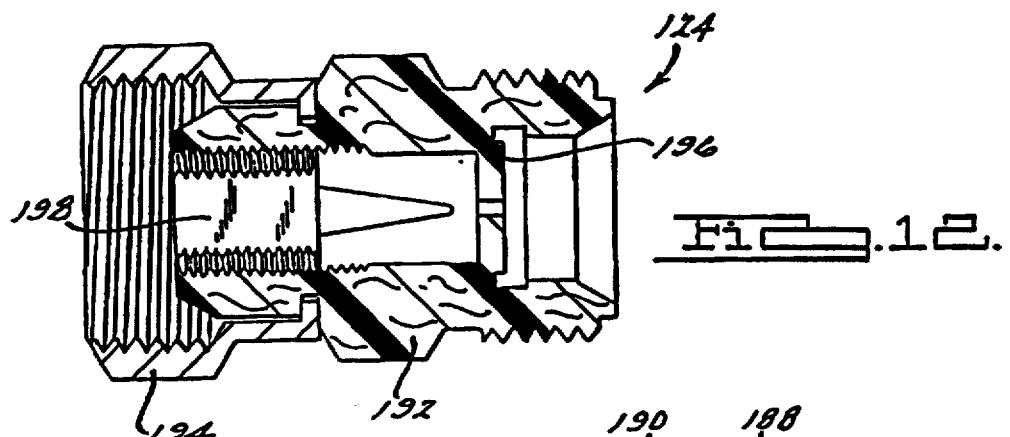
Fig.12.
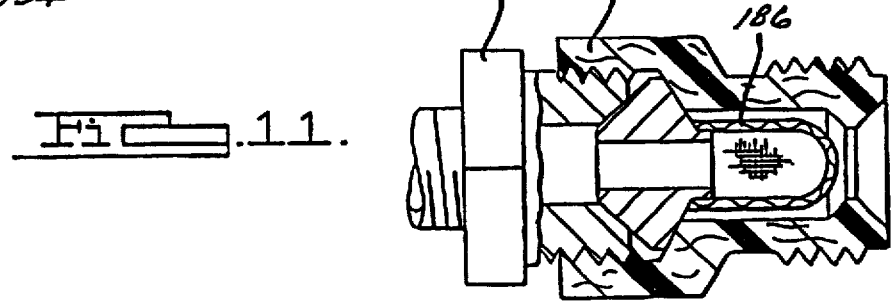
Fig.11.
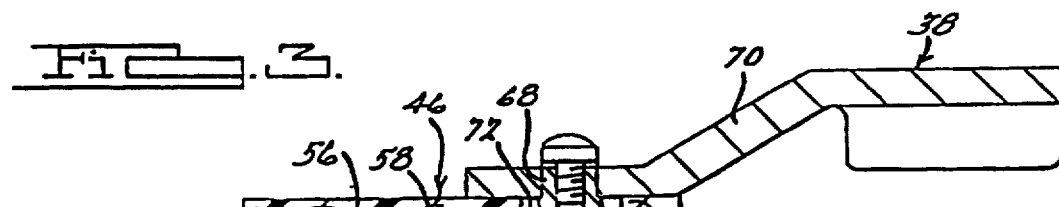
Fig.3.
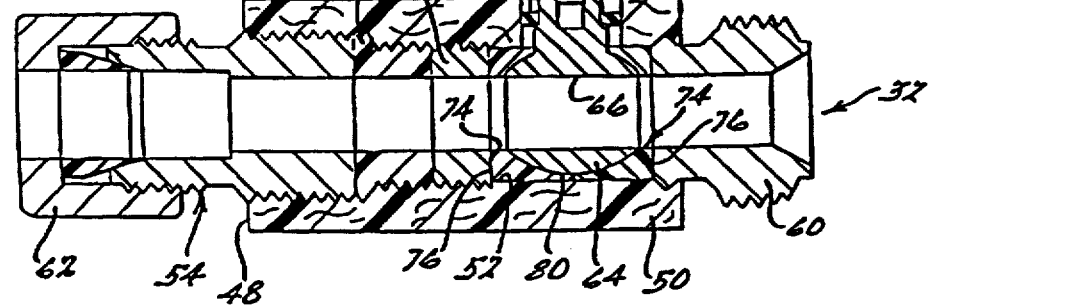
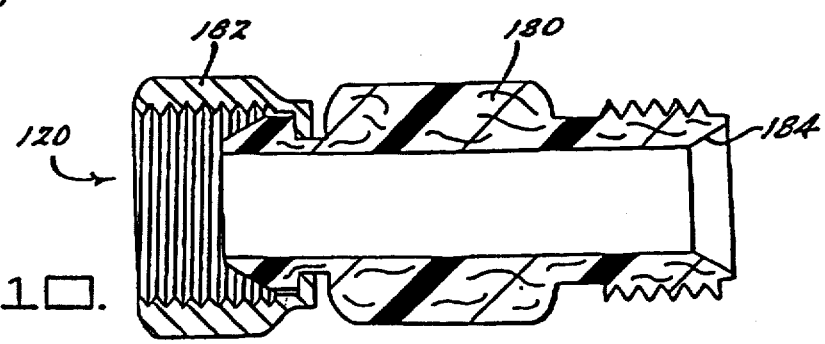
Fig.10.

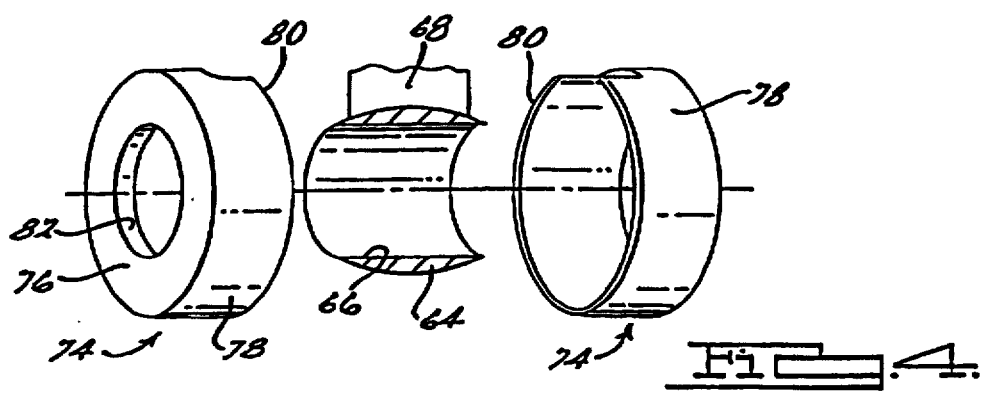
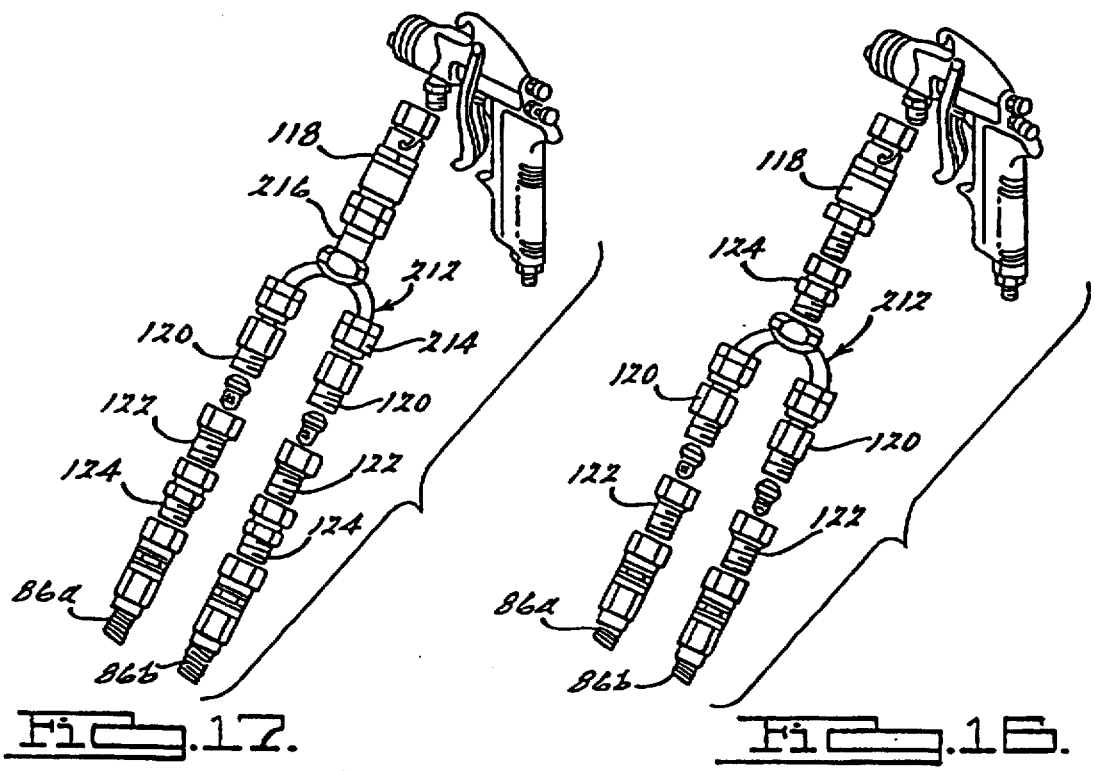
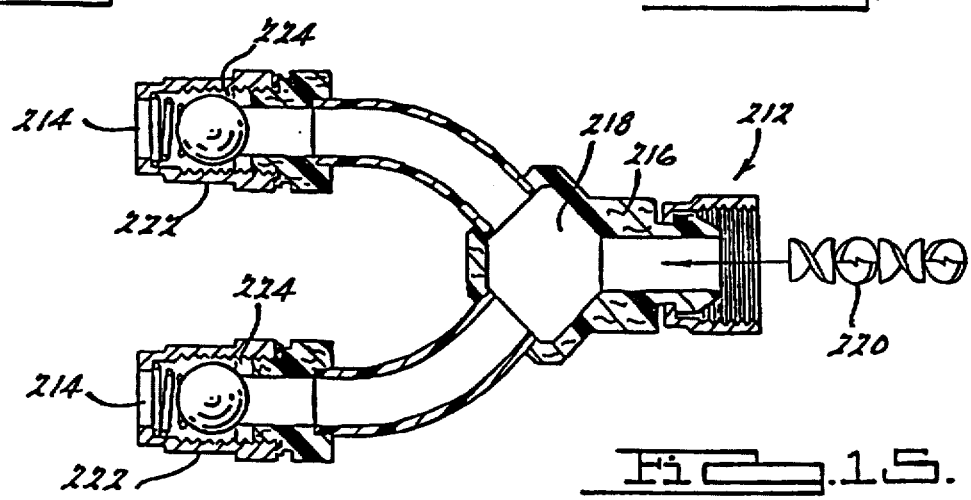

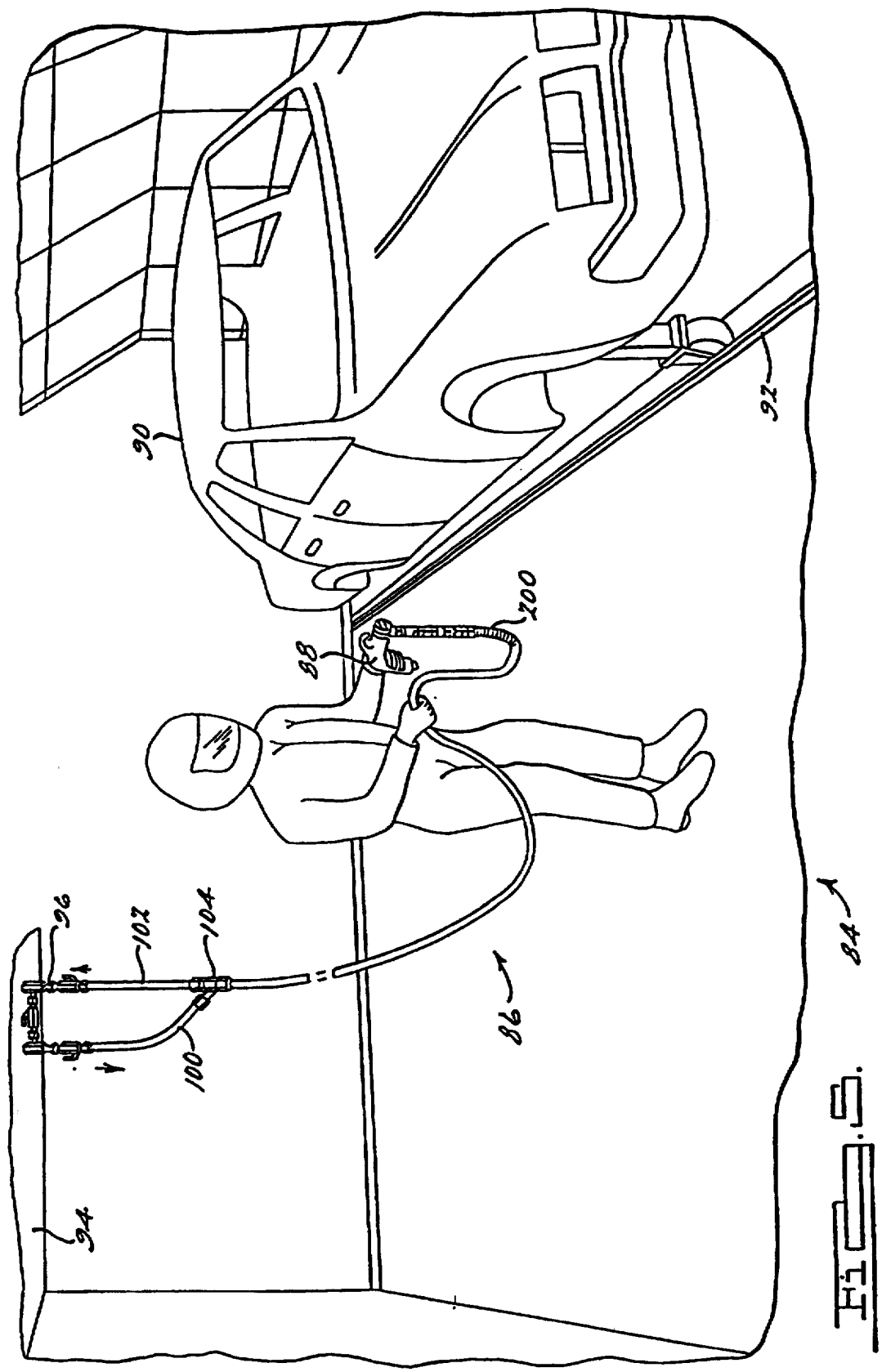

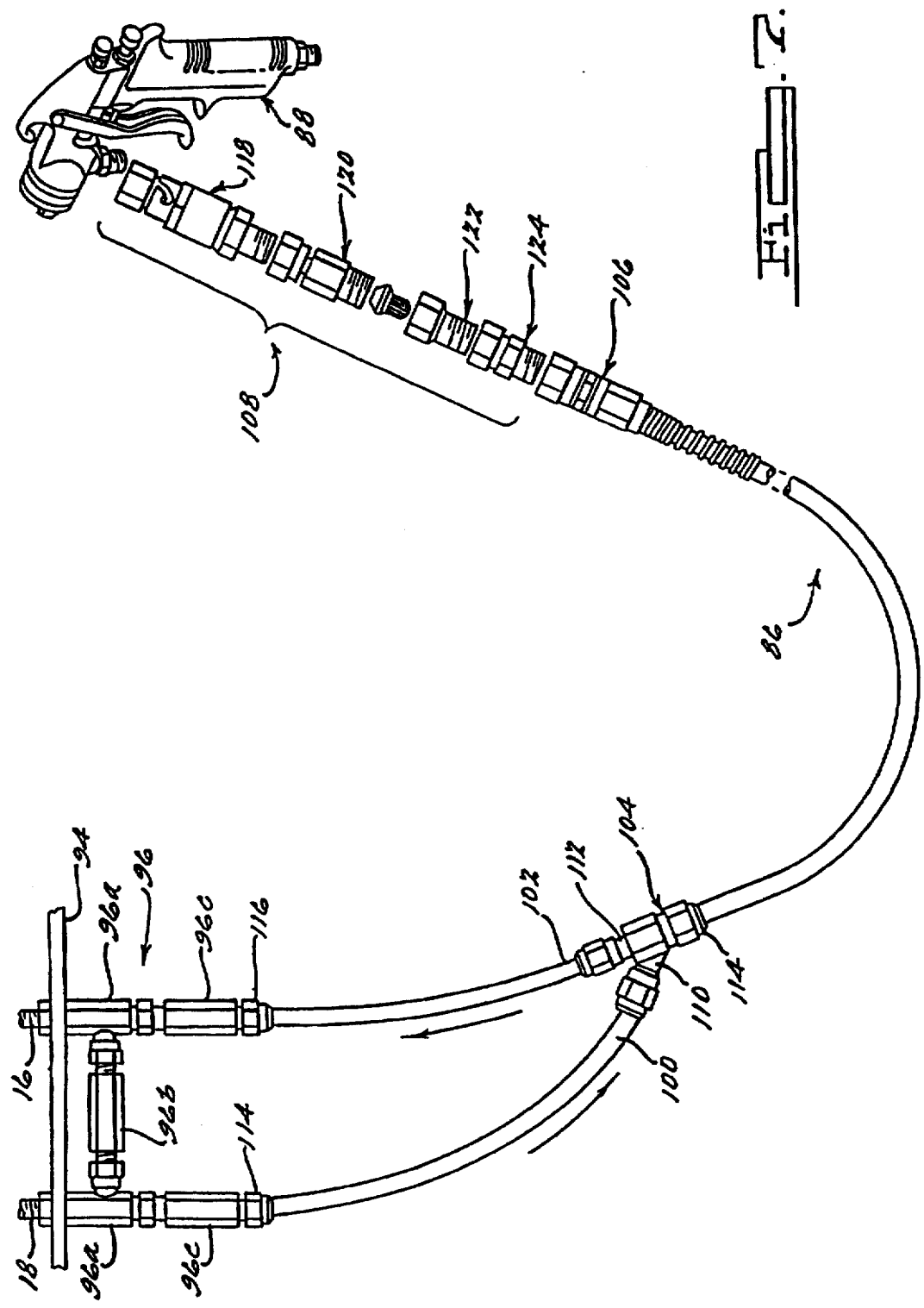

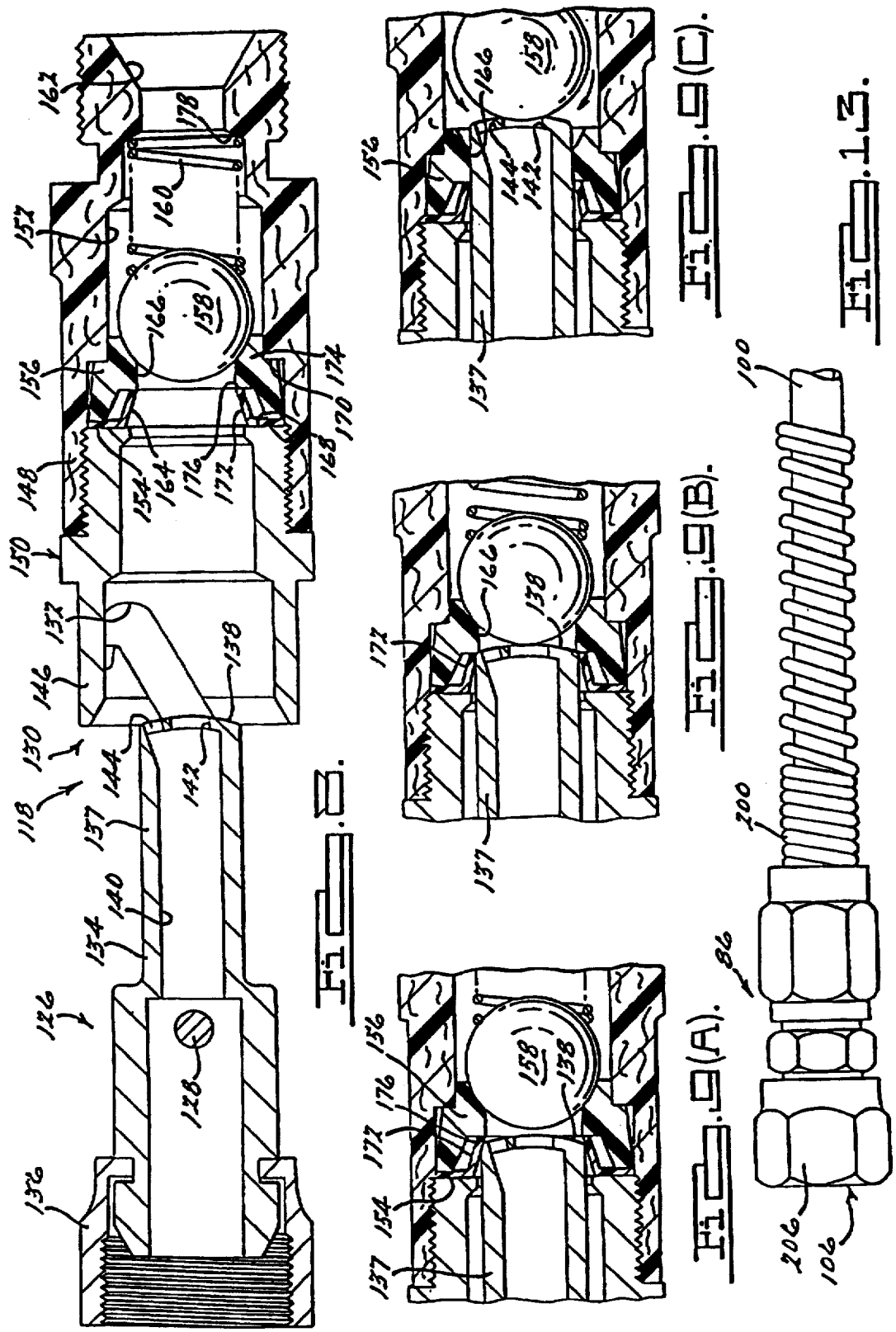

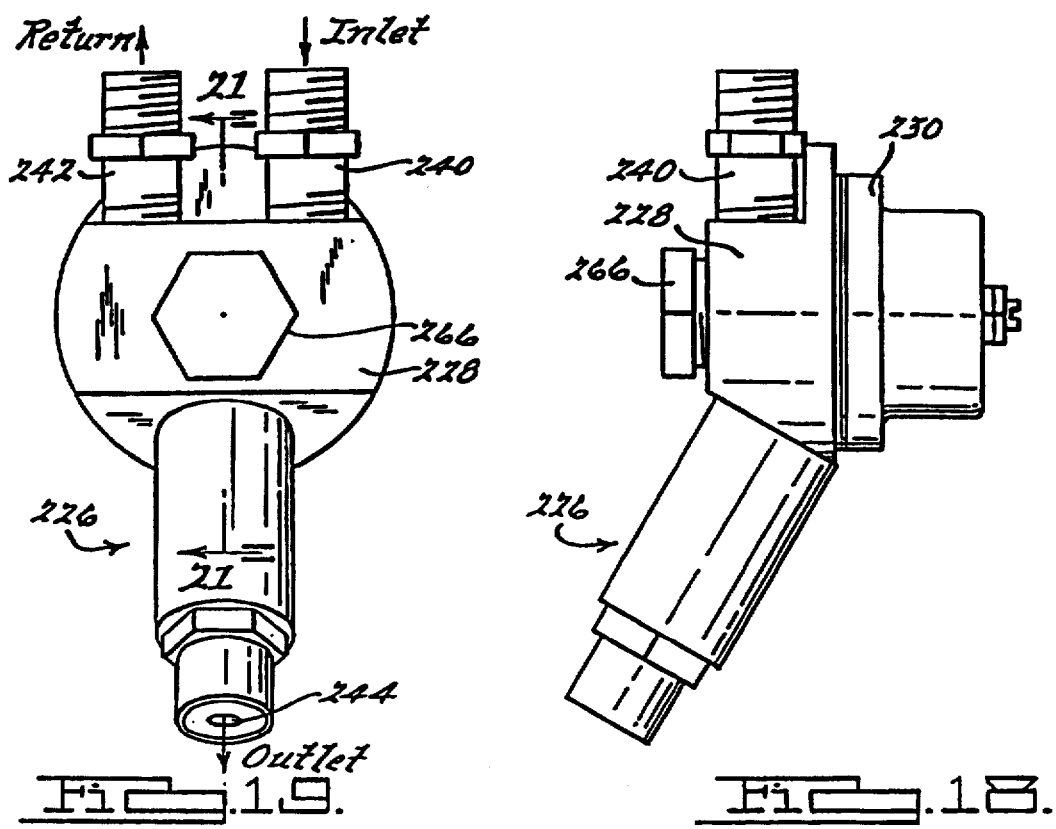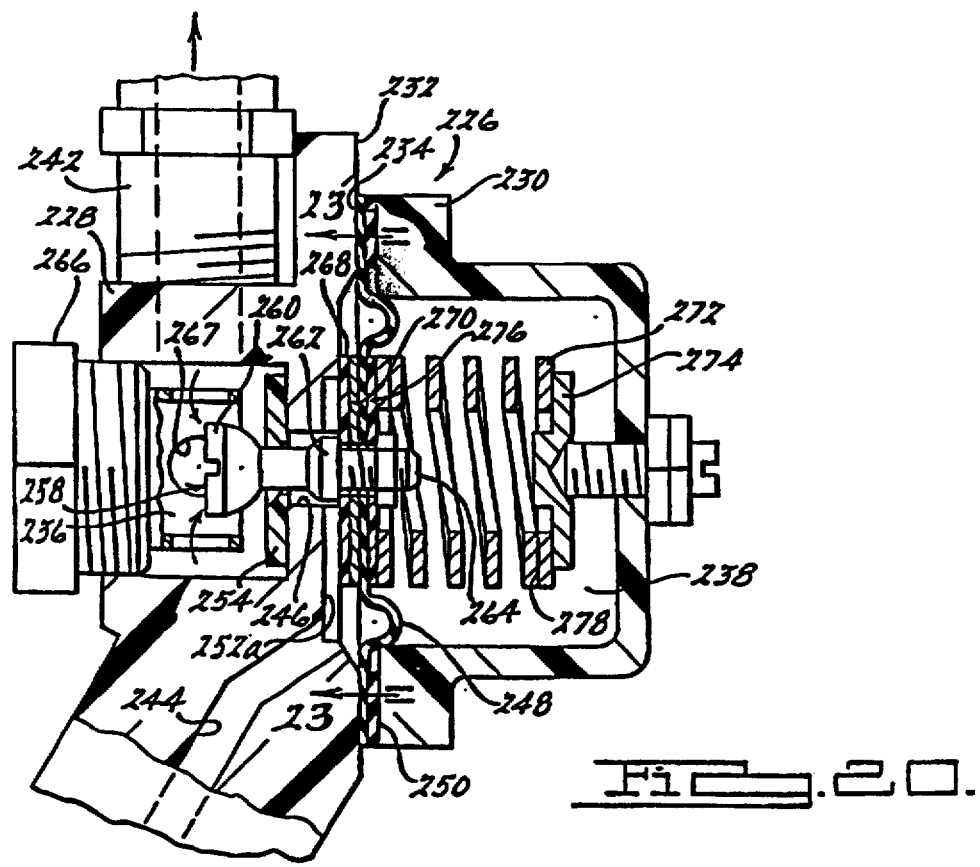

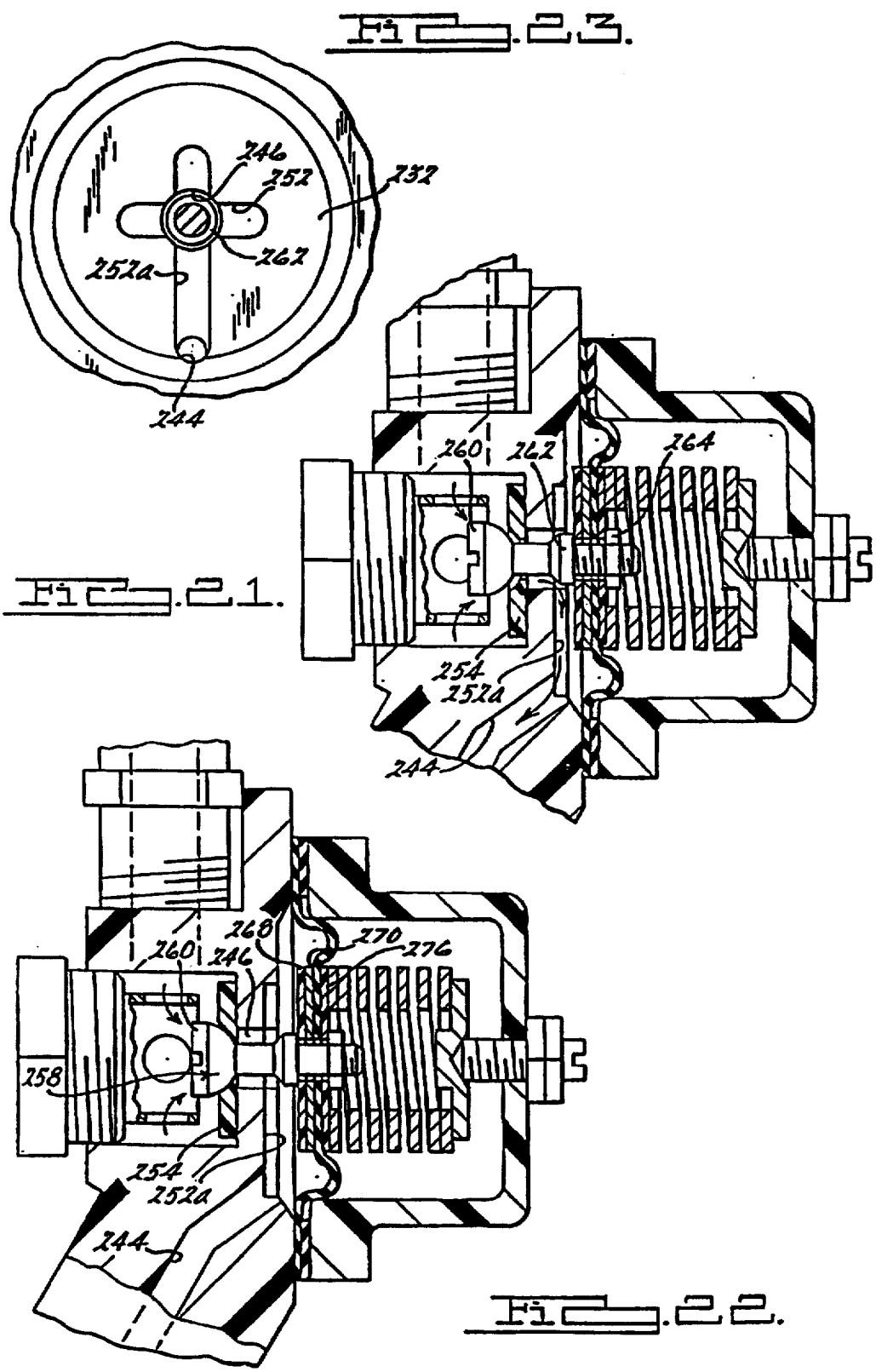

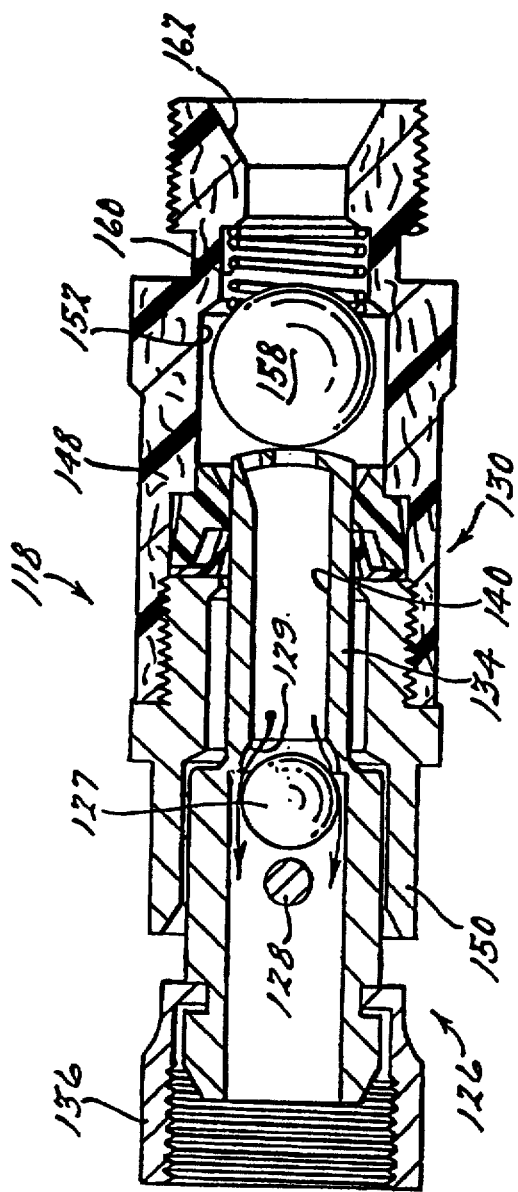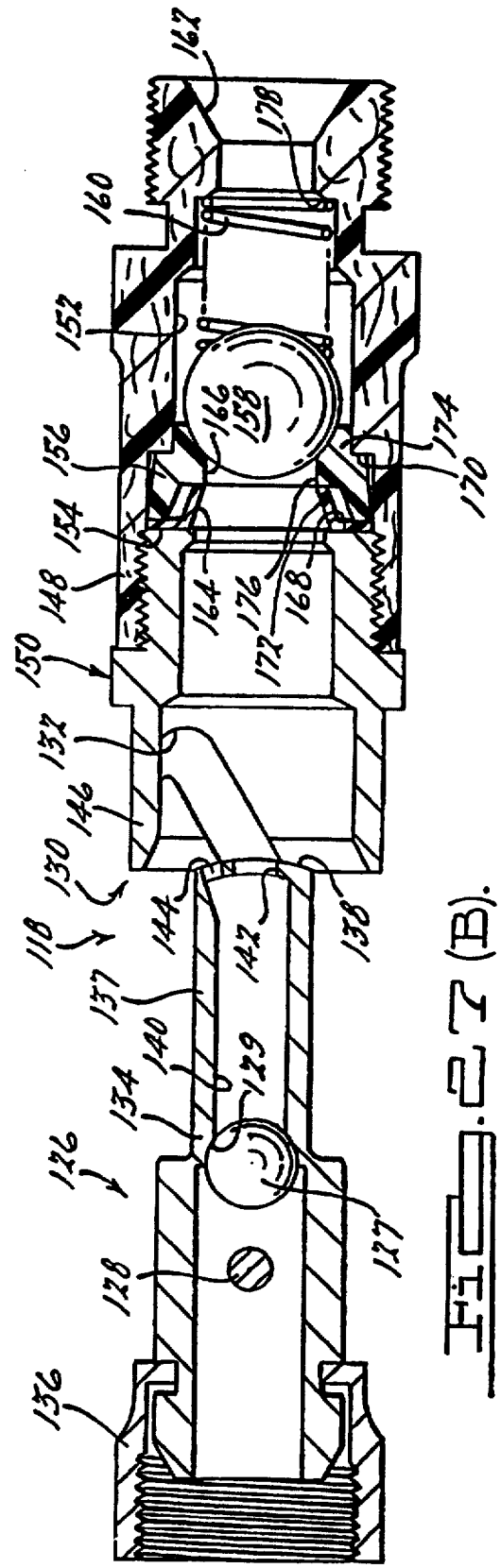

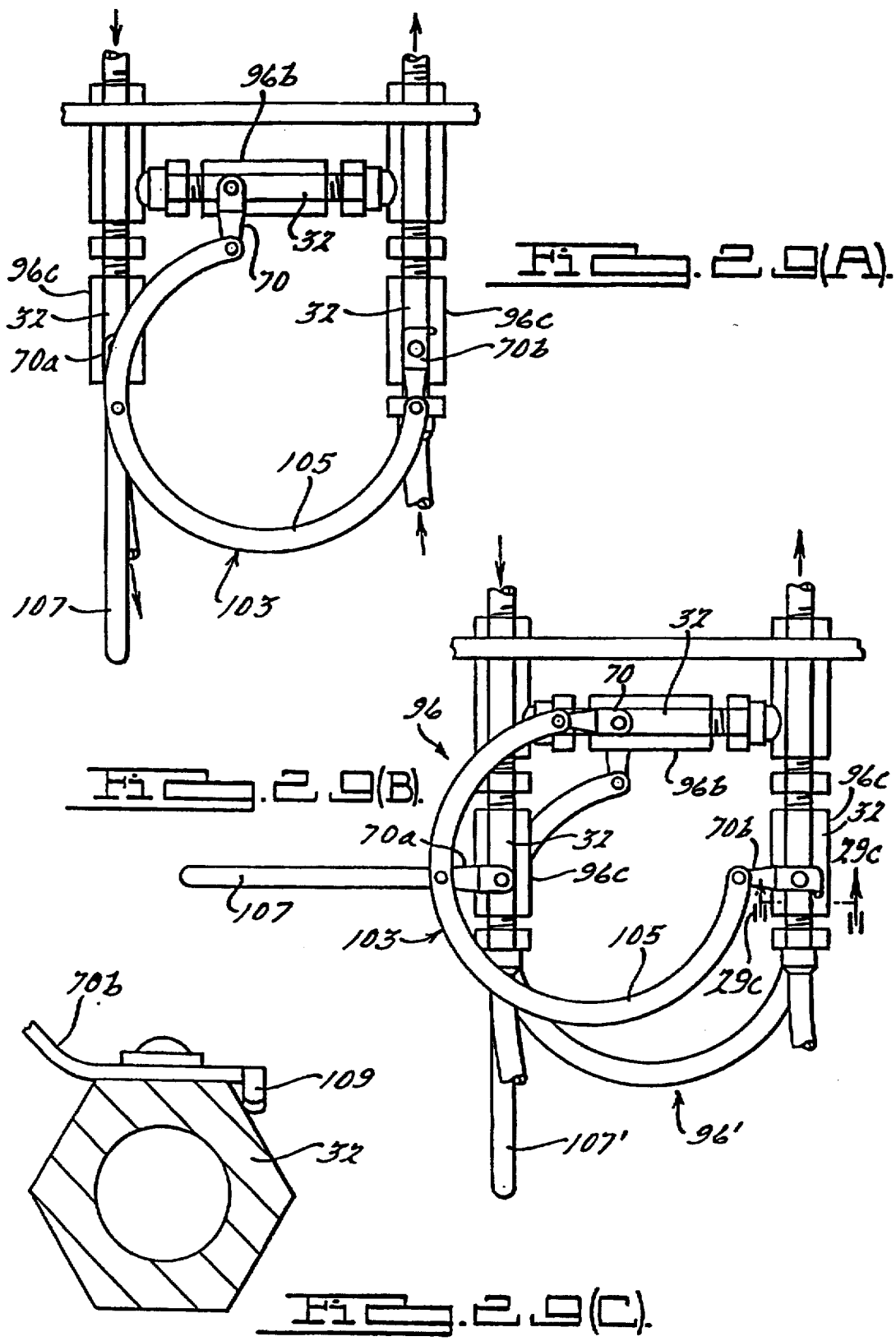

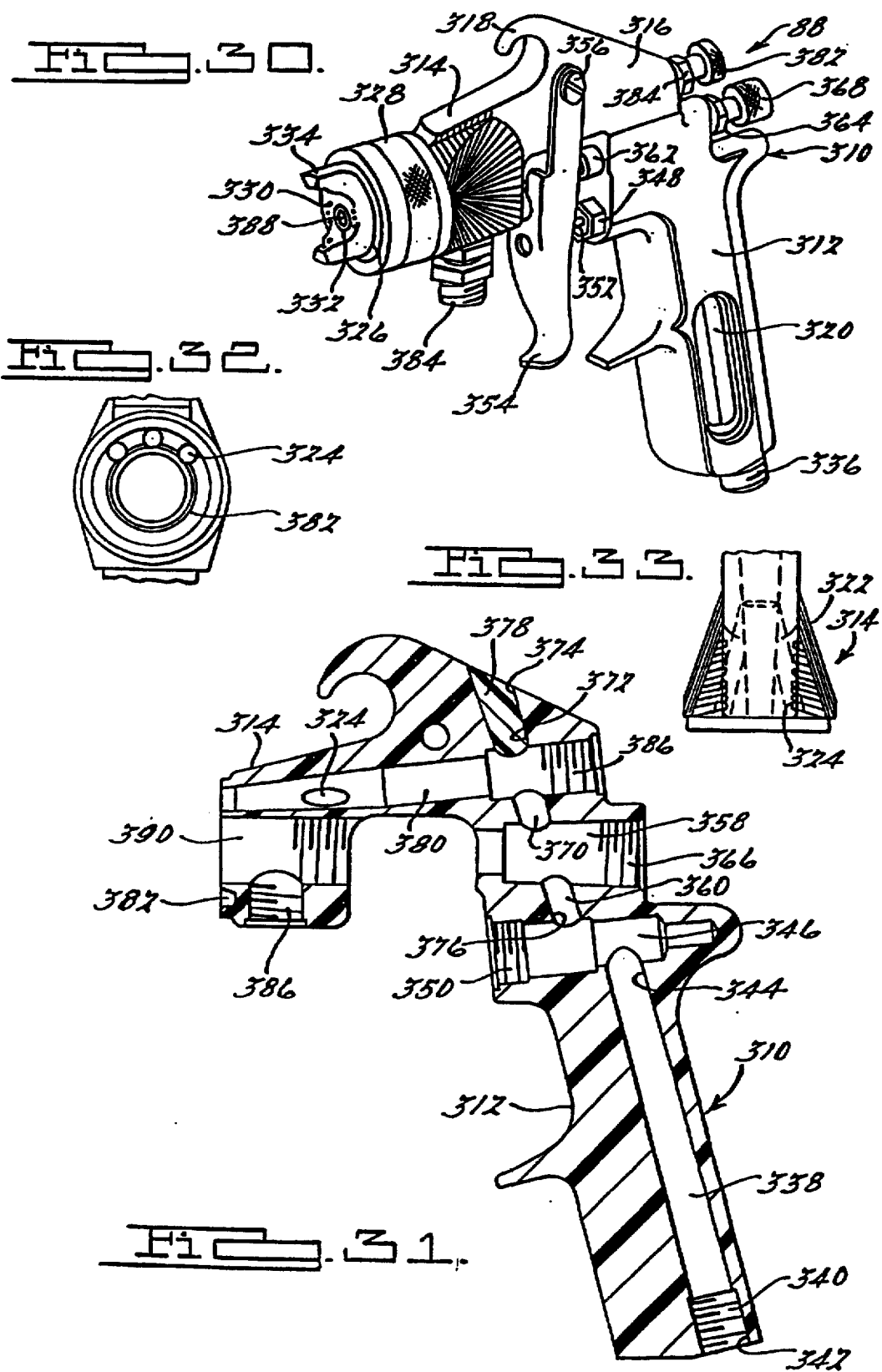

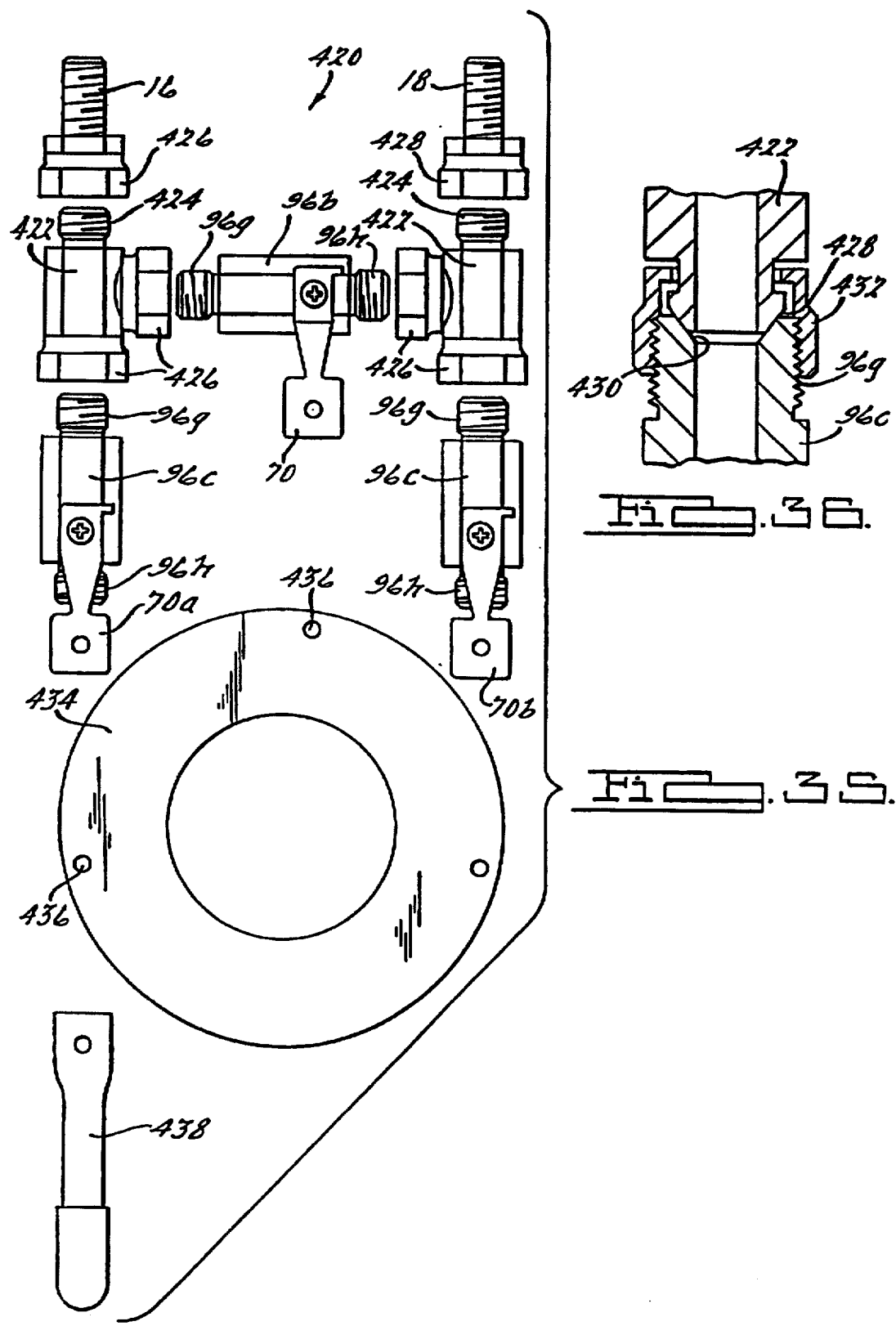

RECIRCULATING PAINT SYSTEM HAVING AN IMPROVED SPRAY GUN

This application is a continuation-in-part application of U.S. Pat. Ser. No. 08/503,979, entitled "A RECIRCULATING PAINT SYSTEM HAVING IMPROVED FLUID COUPLING ASSEMBLIES", filed Jul. 19, 1995, which is now pending, which is a continuation-in-part application of U.S. Pat. Ser. No. 08/161,825, entitled "A RECIRCULATING PAINT SYSTEM HAVING A VALVED QUICK-DISCONNECT FLUID COUPLING ASSEMBLY", filed Dec. 2, 1993, now U.S. Pat. No. 5,501,397, issued Mar. 26, 1996.

BACKGROUND OF THE INVENTION

This invention relates to a paint system including a flexible conduit or hose arrangement to supply a liquid coating composition from a paint supply system to a spray gun. More particularly, this invention relates to an improved spray gun for the paint system.

As those familiar with the prior art will appreciate, in previous paint supply systems, a base coat of paint is applied at a first station and then the article, such as an automobile body, is conveyed to a new station where a clear coat paint is applied, the clear coat paint adding the feeling of depth to the paint. The ability to apply a clear coat and a base coat at the same time would provide a dramatic reduction in the cost of painting the car in the sense that half of the spray booths could be eliminated or deactivated and therefore half of the equipment and half of the manpower could be eliminated from the painting operation.

Additionally, the modern factory is typically spread out and paint booths are not localized in one area or arranged so as to be parallel to one another. As a result, the use of a series connection between paint booths requires extensive tubing, particularly when the paint must be supplied to opposite sides of each booth. Accordingly, it would be desirable to minimize the number of lines needed to supply paint in a paint system and the cost associated with these lines.

A continuing problem associated with the spray application of liquid paints is the presence of foreign particulate matter in the liquid paint supply which causes imperfections on the surfaces of the article being spray painted, frequently necessitating a refinishing or repainting thereof. Such foreign particulate matter, sometimes referred to as "seeds," or "strings," or "snotters" are formed in many instances as a result of an agglomeration of the paint constituents during standing or recirculation of the liquid paint necessitating removal prior to discharge through the spray nozzle. The foregoing problem is particularly pronounced in recirculating type liquid paint systems, although they are present in direct line systems as well.

Recirculating paint supply systems conventionally comprise a mixing tank equipped with suitable agitation for maintaining the liquid coating composition uniformly mixed and a pump for transferring the liquid coating composition under a desired pressure to a manually manipulable supply conduit connected to the spray nozzle. A suitable return hose is provided for returning the excess quantity of paint back to the mixing tank for recirculation and to keep the paint in suspension. Typical of such a system is the recirculating paint supply system shown in U.S. Pat. No. 5,060,861, the specification of which is incorporated herein by reference. In this paint supply system, the supply and return hoses are interconnected by suitable fluid fittings so as to form a single conduit having coaxial passages for supplying and returning the liquid composition.

This and like paint systems typically will utilize many different fittings, connectors and coupling arrangements to complete the necessary fluid interconnections. Such fittings are often generally made of metal which can result in the conduit being relatively heavy. However, the paint supply hoses or unitized fluid conduit, and the associated fluid fittings, should be as light as possible to reduce operator fatigue and enable the operator to manipulate the position of the spray gun.

Moreover, conventional spray guns are also generally made of metal which results in the spray gun, including the fittings to be relatively heavy. This weight may cause operator fatigue or ailments based upon the continuous and repetitive use of the heavy spray gun, which typically weighs about 22 ounces. Still further, as the work day draws on, this fatigue increases which may cause an appreciable decrease in finish quality of the object being coated. This decreased quality generally occurs because the operator may angle the spray delivered from the spray gun as opposed to maintaining the spray substantially perpendicular to the object which is desired.

Seals and filters are also included in the paint supply line to seal the interconnections as well as to remove particulate matter from the paint being provided to the spray gun. In spite of the seals and filters, foreign matter can still be present. For example, the quick connectors used for the spray gun tend to create spit at the quick disconnect upon disconnecting which is generally not noticeable but, when dry, will cause leakage and contamination to occur. Further, to prevent leakage, it is known to cover the threaded sections of fluid fittings with pipe dope and then assemble the fittings. While this arrangement works well in many fluid sealing applications, it has several disadvantages. First, a pipe fitter must be called to assemble or disassemble the unit, which can be an inconvenience. Further, exposed threads create voids in the joint between the components which causes paint to accumulate and generates paint particles (dirt, etc.) that will be sent downstream and end up on the car, resulting in the need to rebuff and/or repaint the car.

Various flow control devices or paint restrictors are also used with paint supply systems. In many cases such prior art constructions have been handicapped by their tendency to become plugged over periods of use, necessitating frequent replacement and/or downtime to permit cleaning to restore them to proper operating conditions. The build up of deposits in such flow regulators cause a progressive decrease in the pressure of the liquid coating composition supplied to the spray nozzle, thereby resulting in variations in the quality and thickness of the coating, thus detracting from their use.

Moreover, a flow control device must include an element that moves relative to its valve body in order to change the flow rate. For example, a conventional ball valve has a rotatable ball member through which fluid can flow and seal portions positioned at the opposing upstream and downstream faces of the ball to inhibit flow therearound. Extended use of the valve member in one flow position can result in paint coagulating in voids formed around the seal portions. When the ball member is rotated, paint portions can break loose, thus detracting its use. Paint flakes, particles and dirt can result from the mating of fluid connector members, notwithstanding a seal being positioned to prevent flow around mated portions.

Accordingly, it would be desirable to limit or replace the use of threaded fittings with compression fittings, or those that use only pressure, thereby eliminating voids which tend to cause the paint to accumulate.

Moreover, it would also be desirable to reduce the weight of the conventional spray gun and fittings, thereby reducing operator fatigue and increasing finish quality.

SUMMARY OF THE INVENTION

The benefits and advantages of the present invention are obtained in a recirculating paint supply system that has a substantially flexible recirculating fluid conduit connected at one end to a spray gun and at its other end to supply and return lines of a paint supply.

To selectively connect and disconnect the supply and return lines of the paint system to the supply and return hoses of the recirculating conduit, a series of ball valves are interconnected to form an H-shaped fluid connector assembly. According to an exemplary embodiment of this invention, a funnel shaped seal is sandwiched between mating frustoconical surfaces of the interconnected ends of the valves whereby to form a compression seal. Alternatively, the interconnected ends of the valves may be coupled by the use of flare fittings using mating conical surfaces. Additionally, the interior surfaces of the valves which contact the paint composition are comprised of stainless steel or other suitable metal, that is resistant to attack by the paint.

According to a preferred embodiment of the paint system of the present invention, the H-shaped fluid connector assembly includes a connecting mechanism having an annular member pivotably mounted to each handle of the ball valves. When the annular member is moved with a clockwise force, each handle on each ball valve is simultaneously moved to simultaneously open and close the ball valves. This allows the recirculating conduit to be quickly checked for pressure differential or loss.

According to a preferred embodiment of the paint system of the present invention, the discharge end of the recirculating fluid conduit has a fluid fitting secured thereto. In an exemplary embodiment, helical convolutions having a predetermined pitch width extend radially outward from the fitting, and a guard for protecting the outer periphery of the conduit and providing strain relief to conduit is secured to the helical convolutions. The fluid fitting includes a rotatable coupling nut, and the guard includes a wire helically coiled to form a generally cylindrical member that encircles an axial portion of the conduit and extends axially away from the fitting. A portion of the wire helix has the same predetermined pitch width as and threadably engages the convolutions, coupling rotation of the nut tending to tighten the engagement of the coil with the convolutions.

According to another preferred embodiment of the paint system of the present invention, particularly applicable for the manual spray application of liquid coating compositions, a quick disconnect connector assembly is provided to enable the rapid connection and disconnection of the fluid conduit and prevent unwanted spit of paint during the connection or disconnection to the spray gun. The quick disconnect connector assembly comprises a valve body having a bore, a tubular fluid conduit having a stem which is inserted into the bore, a seal element having a passage positioned in the bore, and a first closure member normally engaged with the seal for sealing the passage and movable from sealed engagement by the inward insertion of the stem. The stem and the seal passage are dimensioned such that the forward end portion of the stem is adapted to establish sealing engagement with the wall of the seal passage both when the stem has been partially inserted into the passage but prior to engaging the first closure member, during which time no flow is permitted through the connector assembly, and also when fully inserted into the passage, whereby to move the first closure member from its flow preventing engagement with the seal.

According to another preferred embodiment of the quick disconnect fluid connector assembly of the present invention, the stem includes a second closure member to seal the stem when it is removed from the bore of the valve body. When the stem is inserted into the bore and the first closure member is moved from engagement with the seal, the pressure and fluid in the fluid conduit causes the second closure member to be moved to enable the flow of fluid through the stem. When the stem is removed from the bore and the first closure member engages the seal, the pressure and fluid downstream of the stem causes the second closure member to be moved to inhibit flow of fluid through the stem, thereby inhibiting the stem from spitting fluid during disconnection.

According to another preferred embodiment, a flow control device of the present invention comprises a valve body having opposite end portions and a bore extending between the end portions, a closure member, including a rotatable ball member in the bore and having a passageway therethrough, for selectively opening and closing the bore to permit and prevent flow through the bore, and seal means, operating to encapsulate the ball member, for sealing the bore to prevent unwanted fluid leakage. The seal operates to eliminate voids in which paint could collect and break free to contaminate the paint system during rotation of the ball.

Further, certain of the connection elements provided in the flexible recirculating conduit are comprised of a suitably configured polymeric material which combines strength and functional relationships and decreases weight, the material preferably being of a glass-filled nylon with a ceramic. Importantly, the fluid connection elements connecting the supply to the inlet end of the conduit are comprised of stainless steel.

Still further, the improved spray gun of the present invention is also comprised of a suitably configured polymeric material, such as glass-filled nylon with a ceramic. This material reduces the overall weight of the spray gun while at the same time increasing the overall strength and durability of the spray gun. Moreover, the improved spray gun further includes enlarged air passages which allows a greater volume of air to pass through the spray gun to achieve better atomization at any pressure. Such an improved spray gun, decreases operator fatigue, increases durability, and further increases overall surface quality of the paint finish because of the reduced fatigue and the better atomization.

The present invention overcomes many of the problems and disadvantages associated with prior art constructions, providing simple, economical yet durable devices which can be directly connected to the fluid inlet of a conventional spray gun or the improved spray gun and is easily manipulable by an operator. Significantly, flakes and other particles which could interfere with the quality of the painted surface are inhibited and possibly eliminated.

Additional benefits and advantages of the present invention will become apparent upon a reading of the description of the preferred embodiments taken in conjunction with the accompanying drawings.

BRIEF DESCRIPTION OF THE DRAWINGS

FIG. 3 is a section view of a ball valve fluid connector including a seal arrangement according to this invention.

FIG. 4 is an exploded view, in section, of the seal arrangement shown in FIG. 3.

FIG. 5 is a perspective view of an individual spray station and incorporating a coaxial recirculating conduit for supplying and returning excess liquid paint coating composition to the supply system embodying the invention.

FIG. 7 is a partly exploded schematic view of the recirculating conduit shown in FIG. 3 and the fluid connectors therefor.

FIG. 8 is an exploded assembly view, in section, of a quick disconnect fluid connector assembly according to this invention.

FIGS. 9(A), 9(B) and 9(C) are side views in section showing the quick disconnect fluid connector assembly of FIG. 8 being connected.

FIG. 10 is a section view of a swivel fluid connector.

FIG. 11 is a section view of a filter fluid connector assembly.

FIG. 12 is a section view of a restrictor fluid connector.

FIG. 13 shows the discharge end portion of the recirculating conduit.

FIG. 15 is a section view of a Y-shaped fluid coupler for mixing two coating compositions according to this invention.

FIG. 16 illustrates another preferred embodiment of a recirculating paint supply conduit according to this invention, the conduit being particularly useful for mixing two paint coating compositions.

FIG. 17 illustrates another preferred embodiment of a recirculating paint supply system according to this invention, the conduit being particularly useful for mixing two paint coating compositions.

FIGS. 18–23 are views of a fluid flow regulator adapted to be connected to a recirculating paint system according to this invention.

FIGS. 27(A) and (B) are sectional views of another preferred embodiment of a quick disconnect fluid connector assembly according to this invention.

FIGS. 29(A)–(C) are views of yet another preferred embodiment of the H-shaped fluid connector assembly according to this invention.

FIG. 30 is a perspective view of the improved spray gun according to this invention.

FIG. 31 is a cross-sectional view of the body of the improved spray gun according to this invention.

FIG. 32 is a front end view of the head portion of the improved spray gun according to this invention.

FIG. 33 is a top view of the head portion of the improved spray gun according to this invention.

FIG. 35 is a exploded view of yet another preferred embodiment of the H-shaped fluid connector assembly according to this invention.

FIG. 36 is a cross-sectional view of a flare fitting utilized in the H-shaped fluid connector assembly of FIG. 35.

DESCRIPTION OF THE PREFERRED EMBODIMENTS

Figure 1:
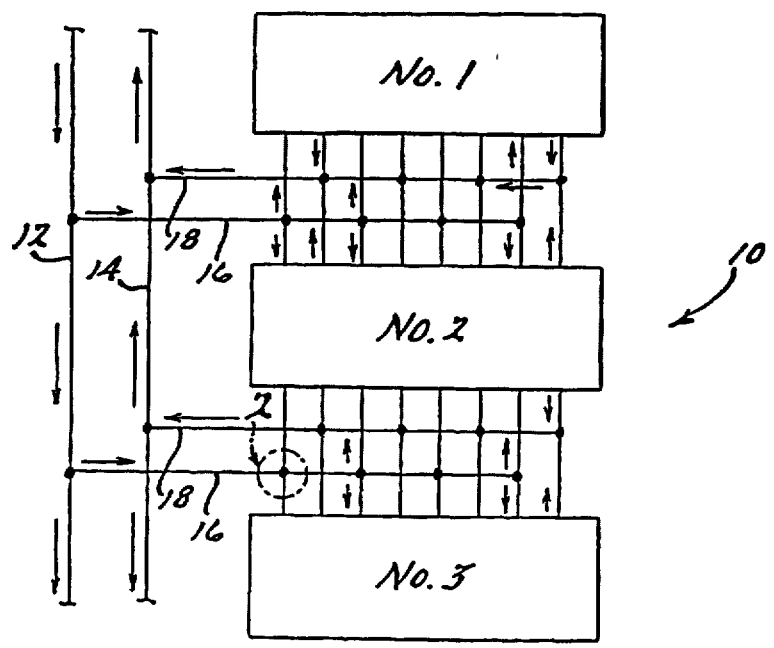
FIG. 1 is a schematic view of a multiple spray station arrangement of a recirculating liquid paint coating composition supply system embodying the invention.

Referring now to the drawings, and as may best be seen in FIG. 1, a multiple station recirculating liquid paint coating composition supply system 10 is illustrated. The supply system illustrated in FIG. 1 illustrates a paint system for recirculating a single paint of a specific color to each of the three spray stations identified at Numbers 1, 2 and 3. In the embodiment shown, each station is in communication with a pressurized liquid coating or paint supply header 12 and a low pressure paint return header 14. It will be appreciated that the spray stations illustrated in FIG. 1 can form a row of separate spray booths to provide for a plurality of different coating compositions and/or different colors. By way of example, each spray station may include twelve different systems to supply twelve different colors of the desired coating composition.

The paint supply system typically includes a supply tank and a supply pump for supplying the liquid coating paint composition under pressure to the supply header. The quantity of paint composition that is supplied but which is in excess of that required at the multiple stations is returned to the supply via the return header. A supply branch line 16 at each spray station is connected to the supply header 12 and in turn is connected to a shut off valve at the entry to the spray booth whereby to supply paint composition to a desired spray station. A return branch line 18 at each spray station is connected to the paint return header 14 and to a shut off valve at the exit from the spray station whereby to return paint composition via the return header to the supply tank.

According to an important feature of the foregoing arrangement, the spray stations can be connected in series and in parallel. That is, each of the plurality of branches permit selective branch lines to service a line of spray stations at different locations and each station to be provided with a plurality of outlets. Additionally, two branch lines can be used to service opposite sides of a common spray station.

Figure 2:
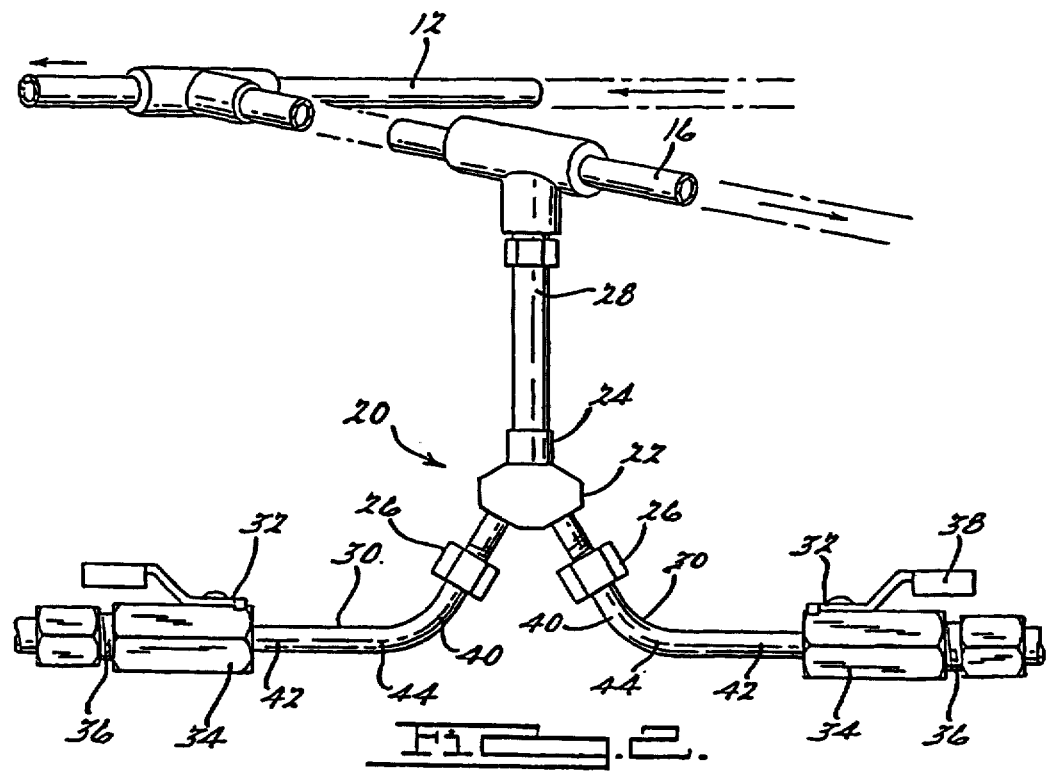
FIG. 2 is a view taken along line 2—2 of FIG. 1 illustrating a fluid connector assembly connecting a paint supply line to a pair of paint stations according to the invention.

As shown in FIG. 2, according to an important aspect of this invention, a specially configured fluid connector assembly 20 is provided to either supply or return the coating composition to each of two spray stations, such as to stations No. 2 and No. 3.

As illustrated, a supply fluid connector assembly 20 comprises a Y-shaped fluid fitting 22 including an inlet port 24 and two outlet ports 26, a generally straight tubular fluid conduit 28 for connecting the inlet port 24 to the supply branch line 16, a pair of angled tubular conduits 30 each having an inlet end connected to one of the outlet ports 26 and an outlet end, and a pair of ball valves 32. The ball valve 32 has an inlet end 34 connected to the outlet end 42 of one of the angled tubular conduits, and an outlet end 36 connected to supply paint composition into the spray station. Each ball valve 32 can be closed to prevent fluid from passing into the spray station, at that location, or opened to permit fluid to pass into the station. When the fluid connector assembly 20 is used to return a paint composition, the outlet ports 26 would communicate the composition from the stations to the fluid fitting 22 and via the fluid conduit 28 into the paint return header 14.

Preferably, the angled tubular conduits 30 have first and second portions 40 and 42 with the first portions 40 extending along a first axis that is generally at an obtuse angle to the fluid conduit 28 and the second portions 42 extending along a second axis that is generally orthogonal (i.e., perpendicular to) to the fluid conduit 28. Generally, the first and second portions are joined by a curved portion 44 and are disposed at an angle of about 130°–140°, and preferably at about 135° to one another.

When connected to the fluid fitting, the fluid conduits 28 and 30 form a generally Y-shaped configuration. While a T-section is known for the purposes of dividing and/or directing a fluid to and along a path that is generally orthogonal to the supply, it is believed that the 90° change in direction is too abrupt in a paint system and can lead to problems. The Y-shaped configuration of FIG. 2 is believed to enhance constancy of volume flow without paint coagulation and obviate any possible adverse effects that may otherwise interfere with the uniformity of paint flow. While not shown, the Y-shaped fluid connector assembly 20 could be used to return the low pressure paint composition to the return header.

Figure 34:
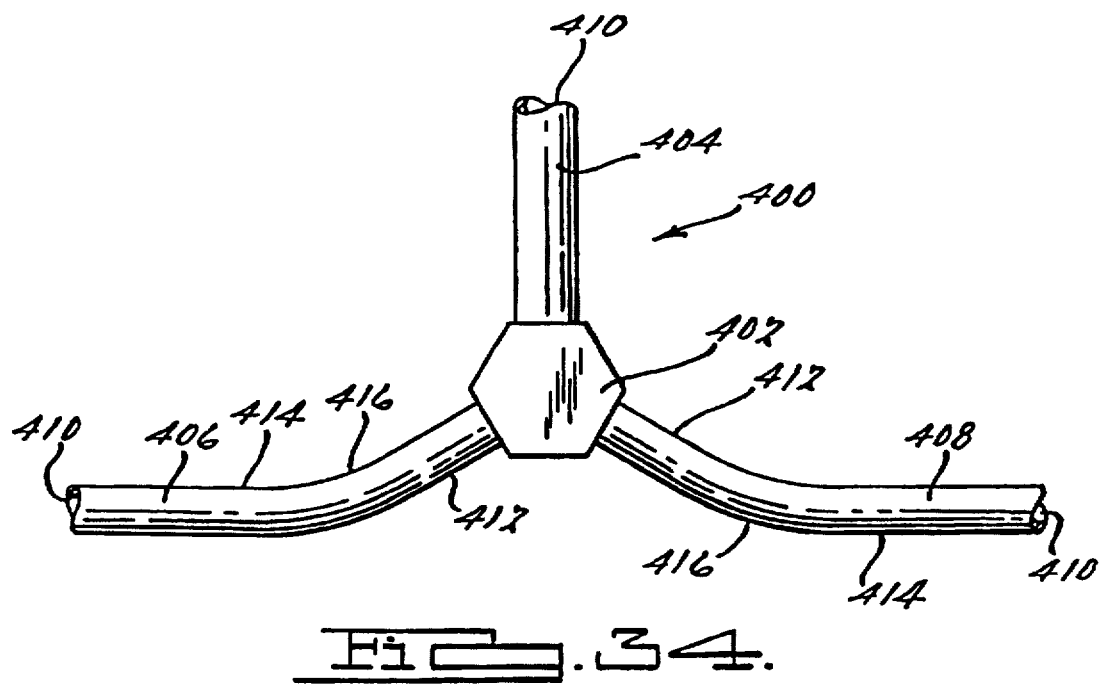
FIG. 34 is a front view of a Y-shaped fluid fitting assembly according this invention.

Referring to FIG. 34, another embodiment of a Y-shaped fluid fitting 400 is shown. The Y-shaped fluid fitting 400 is similar to the Y-shaped fluid fitting 22 and is used for dividing and/or directing a fluid to and along a path that is generally orthogonal to the supply the way a conventional T-section is employed. The Y-shaped fluid fitting 400 includes a body 402, preferably comprised of stainless steel having an inlet tubular conduit 404 and two outlet tubular conduits 406 and 408, respectively. The body 402 may be configured to receive various length tubular conduits 404, 406 and 408 having appropriate angled portions, to be discussed shortly, and configured to be permanently affixed to the tubular conduits 404, 406 and 408, such as by brazing. If permanently affixed, the ends 410 of each tubular conduits 404, 406 and 408 will contain various conventional coupling devices (not shown) to connect the Y-shaped fluid fitting 400 into the supply system 10.

Preferably, as with the Y-shaped fluid fitting 20, the inlet tubular conduit 404 is generally a straight tube while each outlet tubular conduit 406 and 408 includes a first portion 412 extending along a first axis that is generally at an obtuse angle (i.e. about 120°) to the inlet tubular conduit 404 and a second portion 414 extending along a second axis that is generally orthogonal (i.e., perpendicular) to the input tubular conduit 404. The first and second portions 412 and 414 are joined by a curved portion 416 and are displaced at an angle of about 170°–150°, and preferably at about 160° to one another. By providing a body 402 which receives tubular conduits 404, 406 and 408, or by providing permanently affixed tubular conduits 404, 406, 408, the Y-shaped fluid fitting 400 may be coupled and conveniently used throughout the supply system 10 wherever the flow of fluid needs to be directed orthogonal or perpendicular from a supply. By using gradual angled portions 44 and 416 having large obtuse angles (i.e. 130°–170°), the consistency of volume flow is enhanced and any possible adverse effects that may otherwise interfere with the uniformity of paint flow is eliminated such as that associated with T-shaped fittings.

As shown in FIGS. 3 and 4, the ball valve 32 includes a valve body 46 having opposite axial end faces 48 and 50, and a selectively threaded bore 52 extending between its end faces. The following elements are arranged in the bore in the following sequence: a first end fitting 54 adjacent to the end face 48, a Teflon spacer 56, a stainless steel retainer member 58, the spacer and the retainer being threadably connected to the bore, the fluid sealed flow regulator member 38, and a second end fitting 60 adjacent to the end face 50. The first end fitting 54 includes a first portion that is threadably engaged with the bore and a second portion extending outwardly of the bore, the second end portion including a coupling nut 62 for connecting the ball valve 32 to stainless steel tubing. The second end fitting 60 includes a first portion threadably engaged with the bore and an externally threaded second portion extending from the bore.

The fluid sealed flow regulator member 38 includes a spherical ball 64 rotatably positioned in the bore of the valve body and having a passage 66 extending therethrough, an operating rod 68 extending from the ball and through the valve body, and a handle 70 connected to the operating stem for rotating the ball in the bore whereby to position the passage 66 relative to the bore. An O-ring 72 is provided to seal around the rod 68 where it passes through the valve body.

According to this invention, the valve body 46 is comprised of a polymeric material, such as glass filled nylon with a ceramic or stainless steel. Preferably, the externally threaded first portions of the end fittings are embedded in the polymeric material or formed into the stainless steel. Further, except for the elements that must be resilient to complete a seal, it is contemplated that the end fittings, the retainer member and the ball that makes contact with the paint composition be comprised of stainless steel, or other suitable material having a resistance to attack by the paint. It is believed that when the paint is subject to metal contact, paint flakes/particles are inhibited in the paint system downstream of the supply and return.

Importantly, a combination bearing and seal arrangement is provided whereby to seal the ball 64 relative to the bore. Although the use of seals which engage the ball element are known, leakage and paint flakes has oftentimes been a problem.

According to this invention, a pair of cylindrical cup-shaped valve seats 74 are adapted to be brought into abutting relation with one another and encapsulate the rotatable spherical ball 64 therebetween. Each valve seat 74 has a flat endwall 76 to sealingly abut the retainer member 58 or the second end fitting 60, depending on whether the valve seat is upstream or downstream of the ball, and a generally cylindrical wall 78 having an axial mating face 80 and forming a semispherical cavity. The mating faces are axially abutted to form an axial seal without introducing any voids. The outer periphery of the cylindrical wall 78 is adapted to engage the bore to form a seal therewith. The endwall 76 has an opening 82 to pass fluid between the valve seats when ball is positioned so that fluid will pass through its passage 66.

In operation, the valve seats 74 are placed on opposite sides of the ball 64 and axially pressed together, whereby the mating faces 80 are abutted to form a substantially void free axial seal, and the cylindrical walls 78 form a cavity to totally encapsulate the ball 64. This bearing cavity completely encapsulates the ball so that no paint can accumulate in the interface between the ball and the stainless steel or polymeric body of the valve, which material would, when dried, lead to the possibility of paint flakes/particles breaking free during rotation of the ball 64. There are no crevices or threads to collect paint or dirt where it can harden and contaminate later paint jobs.

FIG. 5 is a perspective view, embodying the invention, of an individual spray booth 84 in one of the paint stations and a recirculating conduit 86 used by an operator to direct the liquid paint coating composition from the supply system to a spray gun 88. It is to be understood that the spray booth is not exclusively limited to the supply system and paint station arrangement disclosed.

As shown, a product to be painted such as an automotive vehicle 90, is moved through the spray booth by a conveyor system 92. The walls of the spray booth are formed from rectangularly shaped pads of removable plastic film so that walls may be cleaned by simply removing the layers of film.

In the embodiment shown, the supply and return lines from the Y-shaped fluid connector assembly 20 enter the spray booth through the ceiling 94 and into an H-shaped connector assembly 96. Of course, the supply and return could enter in a manner other than that shown (e.g., the lines could enter through a wall of the station). The recirculating conduit has one end thereof connected to the supply and return lines of the paint system via the H-shaped connector 96 and its other end connected to the spray gun 88.

According to an important feature of this invention, the components of the spray gun 88 are preferably comprised of a polymeric material whereby to contribute to an overall decrease in the weight of the conduit handled by the operator. Preferably, the polymeric material would be glass filled nylon with a ceramic. However, the spray gun could also be comprised of metal.

Figure 6:
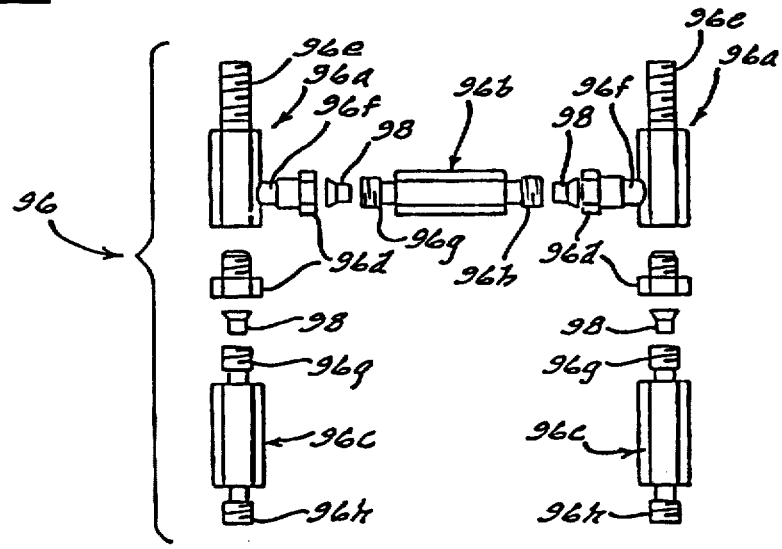
FIG. 6 is an exploded view of an H-shaped fluid connector assembly for selectively connecting or disconnecting the supply system to the recirculating conduit according to this invention.

According to this invention, as shown in FIG. 6, the H-shaped fluid connector assembly 96 is provided for selectively connecting the supply and return branch lines 16 and 18 of the paint supply to the inlet and return ends of the recirculating conduit 86 or interrupting the supply of paint to the recirculating conduit 86 whereby the recirculating conduit 86 may be disconnected for service, cleaning or the like. The H-shaped fluid connector assembly 96 is formed by valves 96b and 96c each having an internal construction as described above for the ball valve 32. Valves 96a are of the bulkhead type and each has an externally threaded sleeve portion 96e at one of its ends for completing a fluid connection, respectively, to the supply and return headers 12 and 14 of the paint system, an internally threaded bore at the other of its ends to threadably receive the threaded end portion of a fluid coupler 96d, and a side branch 96f fitted with a rotatable fluid coupler 96d. The valves 96b and 96c are the same and each has an externally threaded sleeve portion 96g and 96h at its opposite ends. The bypass valve 96b has its opposite sleeve portions 96g and 96h threadably engaged, respectively, with the respective fluid couplers 96d in the side branches of the valves 96a. Each valve 96c has one of its sleeve portions 96g threadably connected with a fluid coupler 96d of a respective valve 96a and the other of its sleeve portions 96h threadably connected to the respective supply and return lines of the recirculating conduit 86, in a manner to be described.

In operation, when the valves 96c are open and the bypass valve 96b is closed, fluid may flow to and from the paint supply and into the recirculating conduit 86 whereby to communicate to the spray gun 88. If however the valves 96c are closed and the 96b is open, fluid cannot pass into the recirculating conduit 86 whereby the recirculating conduit 86 may be replaced, or removed, if desired.

Figure 28A:
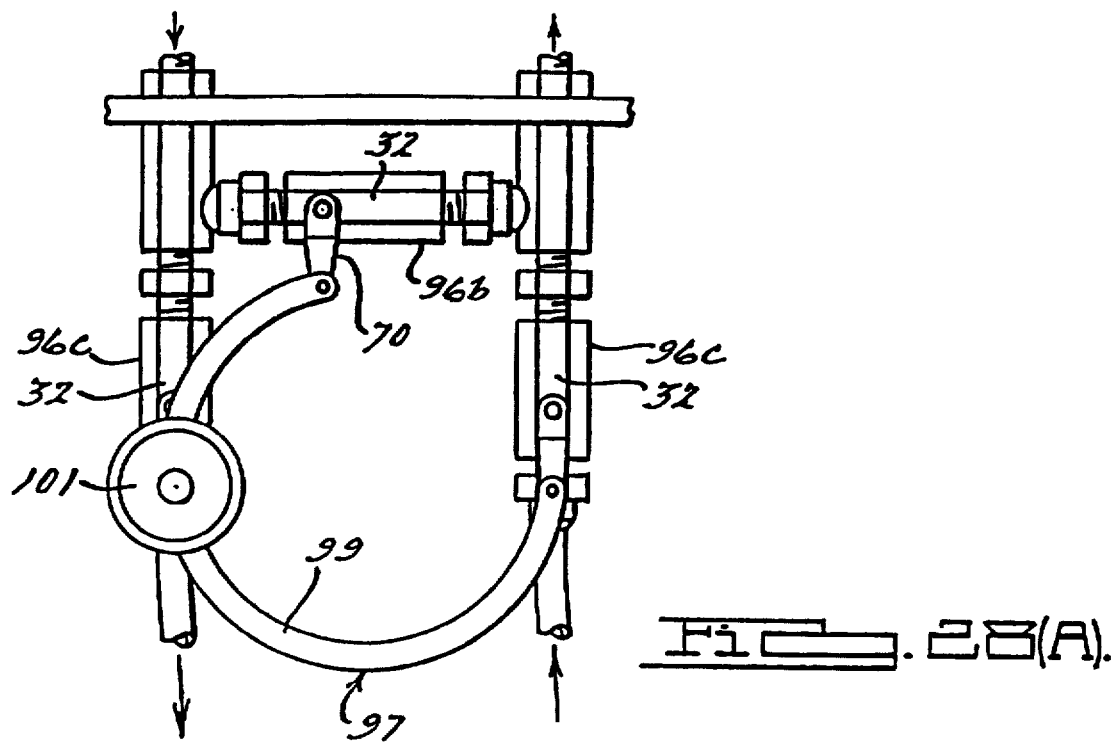
FIGS. 28 (A) and (B) are views of another preferred embodiment of the H-shaped fluid connector assembly according to this invention.
Figure 28B:
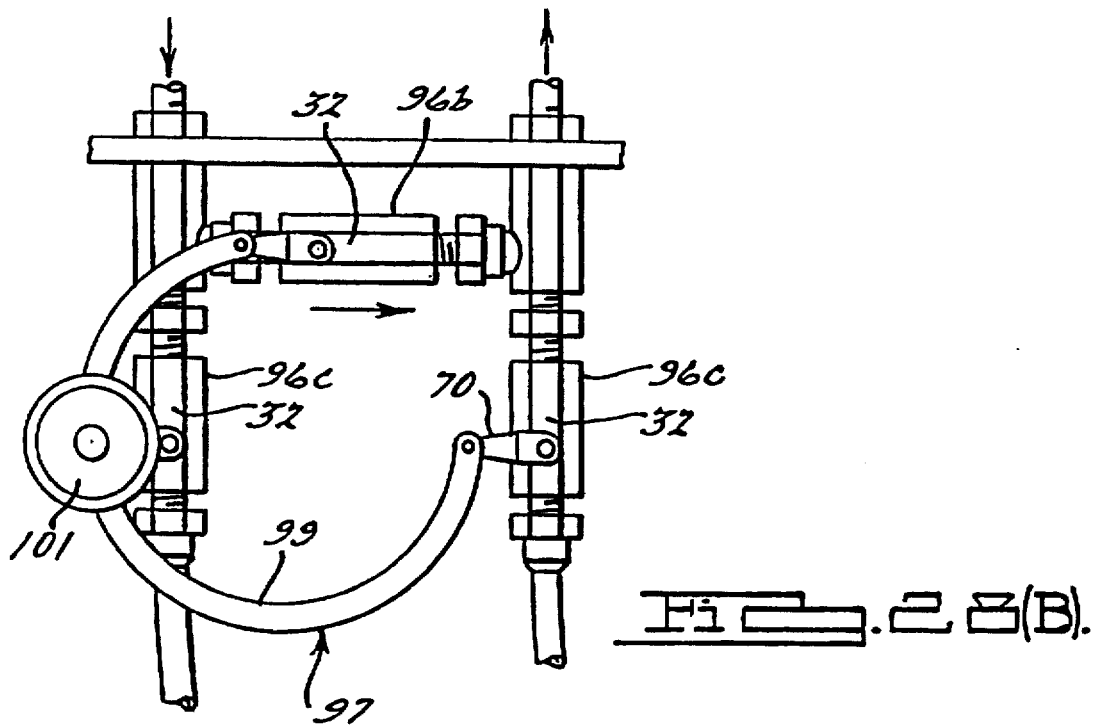

Referring to FIGS. 28(A) and 28(B), the H-shaped fluid connector assembly 96 is shown with a connecting mechanism 97. The connecting mechanism 97 includes a partial annular connecting member 99 constructed of a polymeric material or other suitable material and a handle 101 rotatably mounted to the annular member 99. The annular member 99 is pivotably mounted to each handle 70 of the ball valves 32 comprising the valves 96b and 96c.

Referring specifically to FIG. 28(A), the supply and return valves 96c are open and the bypass valve 96b is closed whereby fluid may flow to and from the paint supply from the supply and return branch lines 16 and 18 to the inlet and return ends of the recirculating conduit 86. Upon pivotably rotating the annular member 99 clockwise using the handle 101, each handle 70 of the ball valves 32 are simultaneously rotated to simultaneously close both valves 96c and open bypass valve 96b, as shown in FIG. 28(B). The handles 70 are simultaneously moved by a user merely grasping the rotatable handle 101 and applying a clockwise force. Upon closing both valves 96c and opening bypass valve 96d, fluid is inhibited from passing into the recirculating conduit 86 whereby the recirculating conduit 86 may be quickly replaced or removed, or checked for pressure differential or loss, if desired.

The connecting mechanism 97 easily and efficiently allows individual spray booths 84 or entire spray stations to be bypassed and removed from the supply system 10. For example, if there is a leak or pressure loss in the system 10, each spray booth 84 must be individually removed from the system 10 in order to determine if a loss of pressure is occurring in that particular spray booth 84. With approximately two to three spray stations, each having between 12 and 20 individual spray booths 84, th e process of individually removing each spray booth 84 from the system 10 can take many man hours if each ball valve 32 must be individually turned. In addition, by having each handle 70 pivotably connected to the annular member 99, this eliminates human error of turning the ball valves 32 incorrectly or inadvertently not turning a ball valve 32.

Referring to FIGS. 29(A)–29(C), the H-shaped fluid connector assembly 96 is shown with another embodiment of a connecting mechanism 103. The connecting mechanism 103 includes a partial annular connecting member 105 constructed of a polymeric material or other suitable material such as steel or aluminum. The annular member 105 is pivotably mounted to each handle 70 of the ball valves 32 comprising the valves 96b and 96c. The handle 70a of the supply valve 96c has an elongated portion 107 which acts as a handle to move the connecting mechanism 103, which will be discussed in detail shortly.

Referring specifically to FIG. 29(A), the supply and return valves 96c are open and the bypass valve 96b is closed whereby fluid may flow to and from the paint supply from the supply and return branch lines 16 and 18 to the inlet and return ends of the recirculating conduit 86. Upon pivotably rotating the annular member 103 clockwise using the elongated portion 107 of handle 70a, each handle 70 of the ball valves 32 are simultaneously rotated to simultaneously close both valves 96c and open bypass valve 96b, as shown in FIG. 29(B). The handles 70 are simultaneously moved by a user merely grasping the elongated portion 107 and applying a clockwise force. Upon closing both valves 96c and opening bypass valve 96b, fluid is inhibited from passing into the recirculating conduit 86.

As shown in FIG. 29(B), there are two (2) H-shaped fluid connector assemblies 96 and 96' shown with one behind the next. The first assembly 96 is shown with the valves 96c closed and the bypass valve 96b open. The second assembly 96' is shown with the valves 96c open and the bypass valve 96b closed. By positioning the connector assemblies 96 and 96', as well as other connector assemblies 96 one behind the next, this allows a user to merely look down the line of connector assemblies 96 to determine which particular assemblies 96 have bypassed the recirculating conduit 86. This also permits the assemblies 96 to be positioned in close proximity behind one another because the elongated portion 107 allows a user's hand to easily grasp the portion 107 in order to move it clockwise or counter clockwise.

Referring to FIG. 29(C), the handle 70b of the return valve 96c is shown taken along the line 29(C) of FIG. 29(B). The handle 70b includes a tang 109 which acts as a stop mechanism to inhibit the handle 70b from being turned clockwise more than about 90° relative to the valve 96c such that the handle 70b is substantially perpendicular to the axial axis of the valve 96c, as shown in FIG. 29(B). The tang 109 also inhibits the handle 70b from being turned counter clockwise more than 90° such that the handle 70b is substantially parallel along the axial axis of the valve 96c, as shown in FIG. 29(A). Because the handle 70b is connected to the other handles 70 of the valves 96b and 96c, via the connecting mechanism 103, the other handles 70 are also inhibited in movement substantially the same as handle 70b. This ultimately enables a user to know when the ball valves 32 are fully opened or fully closed, as well as preventing damage to the ball valves 32 from excessive rotation of the handles 70.

According to this invention, a hollow funnel-shaped seal member 98 is located between mating conical surfaces formed in the sleeve portion of the valves 96a, 96b or 96c and in the fluid coupler 96d and axially compressed into fluid sealed relation. Preferably, the seal member 98 is comprised of Teflon and includes a cylindrical portion at one end and a conical portion at the other end. The sleeve portion includes an inwardly tapering conical wall and an interior cylindrical wall whereby to form a recess sized to nestingly receive the seal member 98. Coupling rotation of the fluid coupler 96d desirably results in a compression fluid seal between the mating members.

Referring to FIGS. 35 and 36, another preferred embodiment of a H-shaped fluid connector assembly 420 is shown for selectively connecting the supply and return branch lines 16 and 18 of the paint supply to the inlet and return ends of the recirculating conduit 86. The H-shaped fluid connector assembly 420 is formed by valves 96b and 96c each having an internal construction as described above for the ball valve 32. The previous T-shaped valves 96a in the H-shaped fluid connector assembly 96 are replaced with T-shaped fittings 422. The fittings 422 each have an externally threaded sleeve portion 424 for completing a fluid connection, respectively, to the supply and return branch lines 16 and 18 of the paint system 10. At the end opposite the externally threaded sleeve portion 424 and also perpendicular to the externally threaded sleeve portion 424 are flare fittings 426.

The flare fittings 426 include a male conical surface 428 which engages a female conical surface 430 of the valves 96b and 96c. Each flare fitting 426 engages the valves 96b and 96c, via a rotable internally threaded swivel nut 432, which threadably engages externally threaded sleeve portions 96g and 96h of the valves 96b and 96c (see FIG. 36). By utilizing the flare fitting 426 having the conical male surface 428 which engages the female conical surface 430, this eliminates the need for the connections to utilize pipe dope, as well as eliminates the need for any type of internal threading within the T-shaped fitting 422 which could accumulate paint over time thereby causing flaking. Moreover, the supply and return branch lines 16 and 18 also include flare fittings 426, thereby eliminating the need for pipe dope when coupling the H-shaped fluid connector assembly 420 to the paint system 10. This enables the one piece H-shaped fluid connector assembly 420 to replace a collection of ball valves which are generally assembled manually and therefor relatively time consuming to install.

Coupled to the handles 70, 70a and 70b is a solid annular connecting member 434. The annular connecting member 434 is pivotably coupled to each handle 70 of the ball valves 32 at pivot points 436 similar to that shown in FIGS. 28A to 29B. Pivotably coupled to the annular connecting member 434 is a handle member 438 which is ridgedly mounted axially to the handle 70a similar to the extension 107 shown in FIGS. 29A and 29B. The annular connecting member 434 is constructed of a suitable material such as steel, aluminum or a polymeric material. Upon pivotably rotating the annular connecting member 434 clockwise using the handle 438, each handle 70 of the ball valves 32 are simultaneously rotated to simultaneously close both valves 96c and open bypass valve 96b, similar to that shown in FIG. 29B. Upon pivotably rotating the annular connecting member 434 counterclockwise by use of the handle 438, each handle 70 of the ball valves 32 are simultaneously rotated to simultaneously open both valves 96c and close bypass valve 96b, as shown similar to FIG. 29A.

FIG. 7 is a partly exploded schematic view of the recirculating conduit 86 used in the paint supply system, including a pressurized paint supply line for supplying paint to the nozzle of the spray gun 88 in a quantity in excess of that required and a return line for recirculating excess paint from the spray gun. The recirculating conduit comprises a pair of hoses 100 and 102 arranged coaxially and including an outer hose 100 which forms a supply conduit, an inner hose 102 which forms a return conduit, a Y-shaped coupling 104 attached to the hoses to direct fluid into the passage formed between the hoses 100 and 102, and a fluid fitting 106 secured to the discharge end of the outer hose 100. The coupling 104 includes an inlet end 110 connected in fluid tight relation to the supply branch line 16 via the H-shaped connector assembly 96, a return end 112 connected in fluid tight relation to the return branch line 18 via the H-shaped connector assembly, and an outlet end 114. The fluid fitting 106 is adapted to connect the discharge end of the recirculating conduit 86 with a fluid fitting assembly 108 for connection to the spray gun 88.

The recirculating conduit 86 and the Y-shaped coupling 104 are similar to those disclosed in U.S. Pat. No. 5,195,680. Generally, the outer hose 100 is of a composite construction to include outer and inner layers, the outer layer being comprised of a material having high strength and flexibility. A suitably material is a mixture of nylon and polyurethane plastics. The inner layer and the inner hose 102 are comprised of a material which is resistant to attack by the liquid coating compositions in contact therewith, nylon being one suitable material.

The fluid fitting assembly 108 between the spray gun 88 and the fluid fitting 106 at the discharge end of the recirculating conduit comprises, in the following sequence, a quick disconnect fluid coupling assembly 118 which is adapted to be attached to the spray gun, a swivel fluid connector 120, a filter fluid connector 122, and a flow control or restrictor fluid connector 124 which is adapted to be coupled to the fluid fitting 106. According to a particular feature of this invention, it is important that the fluid fittings withstand attack of the liquid coatings in contact therewith yet be sufficiently light in weight such that total weight of the spray gun, fittings and hose which must be held and maneuvered manually be held to a minimum. According to this invention, this objective is achieved by selective manufacture of the fitting elements of a polymeric material. As will be discussed further hereinbelow, the quick disconnect, the swivel, the filter, the restrictor, and the fluid discharge connector at the end of the hose are selectively comprised of a polymeric material such as glass filled nylon with a ceramic.

As shown best in connection with FIG. 8 and in the coupling sequence illustrated FIGS. 9(A) to 9(C), the quick disconnect fluid coupling assembly 118 includes a centrally bored quick disconnect stem 126 having a pin 128 extending radially therefrom, and a centrally bored ball quick disconnect connection 130 having a bayonet slot 132 at its forward mating end to interengage with the radial pin to couple the two together. The quick disconnect stem 126 includes an elongated cylindrical stem 134 having an internally threaded coupling nut 136 rotatably mounted thereto for connection to a threaded end of the spray gun 88 and an axial forward end portion 137 adapted to be inserted into the valve member. The stem 134 has an axial end face 138 which protrudes axially forward of the stem body and a central bore 140 therethrough for passing fluid. The end face 138 is slightly semispherical in shape and is provided with a central aperture 142 and one or more peripherally disposed apertures 144, each aperture communicating with the central bore 140.

The quick disconnect connection 130 includes forward and rearward shell portions 146 and 148 which are threadably engaged to form a valve body 150 having a generally cylindrical stepped bore 152 extending centrally between the forward and rearward ends of the body, a pair of seal members 154 and 156 disposed in the bore to seal about the outer periphery of the stem 134 and the bore 152 of the valve body 150, and a closure member in the form of a spherical ball 158 normally biased by a coil spring 160 into engagement with the seal member 156 to prevent fluid from passing through the bore. The forward end of the shell portion 146 forms a cylindrical socket to receive the stem 134 and includes the bayonet slot 132 to engage with the pin 128 during axial insertion of the stem into the valve body. The rearward end of the shell portion 148 includes a conical socket 162 for compression mating with a corresponding conical face on the swivel fluid connector 120.

Preferably, the shell portion 146 is comprised of a metal, such as stainless steel, whereby to endure the forces and wear occasioned during connection and disconnection to the stem 134. To reduce the weight of the conduit system, the shell portion 148 is formed of glass-filled nylon with a ceramic, or other suitable polymeric material not subject to attack by the paint material.

The seal members 154 and 156 are generally planar, circular and have a pair of flat faces, an outer circumference, and a central passage 164 and 166 extending between its respective faces. The seal members 154 and 156 are mounted in the bore 152 in sandwiched relation between the shoulders 168 and 170 formed on the shell portions 146 and 148. The outer diameter of each seal member 154 and 156 is preferably slightly greater than the inner diameter of the bore 152 whereby to provide an interference fit therebetween. When the shell portions 146 and 148 are brought together to assemble the valve body, the seal members 154 and 156 are compressed together to form an axial seal therebetween and a radial seal with the bore 152 of the valve body 150.

Preferably, the confronting faces of the seal members 154 and 156 are formed to include a conical skirt. As shown, the seal member 154 includes a conical skirt 172 which tapers inwardly and into encircling engagement about the entrance to the central passage 166 through the seal member 156. The seal member 156 includes a conical skirt 174 which expands outwardly and into sealing engagement with the inner wall of the bore 152 to complete a 360° sealing engagement therewith. The forward end 176 of the skirt 172 defines a restricted opening of the seal passage that is dimensioned to engage the outer periphery of the stem 134 prior to insertion of the stem into the passage 166 of the seal member 156. During insertion, the forward end 176 centers the stem 134 relative to the passage 166 and is forced against the seal member 156, thus to inhibit any flashback of the high pressure paint.

The closure member 158 is a spherical ball which seats, in part, in the entry to the central passage 166 and against the end face of the seal member 156. The coil spring 160 has its opposite ends disposed against a shoulder 178 of the valve bore and the closure ball 158 whereby to normally axially force the ball into the central passage, thereby compressing the seal material around the passage and forming a fluid seal thereabout.

The central passages 164 and 166 formed by the conical skirt 172 of the seal member 154 or by the wall of the passage through the seal member 156 has a diameter that is slightly less than the outer cross-sectional diameter of the stem 134 whereby to provide a sealed interference fit therebetween upon coupling engagement. Importantly, the stem will engage and seal with the central passages 164 and 166 prior to engaging the closure member.

During coupling, the stem 134 is axially inserted into the front mating end of the valve body 150 and the pin 128 engaged with the slot 132 in the socket thereof, twisted, and progressively inserted. The forward end portion 137 of the stem 134, when inserted, will be successively engaged with the seal members 154 and 156 to seal against leakage, during which time the closure ball 158 is forced against the seal member 156 to prevent fluid passage. Ultimately, upon complete interengagement between the pin 128 and the slot 132, the end face 138 of the stem 134 will engage and axially force the closure ball 158 away from fluid preventing closing relation with the seal member 156.

In FIG. 9(A), the forward end portion 137 of the stem 134 has been axially inserted into the bore 152 by an amount sufficient to engage the conical skirt 172 of the seal member 154, whereby to be in sealing engagement therewith, and to force the forward end 176 of the skirt against the seal member 156. The penetration of the stem 134 is such that a fluid seal is formed therebetween but the stem does not engage with the closure ball 158, which remains biased against and in sealing relation against the rearward end face of the seal member 156.

In FIG. 9(B), the forward end portion of the stem 134 has been inserted into the bore 152 by an amount sufficient to penetrate into the central passage 166 of the seal member 156. The outer periphery of the stem establishes sealing engagement with the seal member 156, without disturbing the sealing engagement between the closure ball 158 and end face of the seal member 156. The stem is also in sealed engagement with the conical skirt 172.

In FIG. 9(C), the axial end face 138 of the stem 134 has reached and driven the closure ball 158 axially rearward from its engagement with the end face of the seal member 156 whereby fluid is permitted to pass through the valve body 150, through the apertures 144 in the end face 138, and through the central bore 140 of the stem 134. The closure ball 158 would then be seated in the central aperture 142 formed in the axial end face 138. Importantly, during withdrawal, the controlled sealing engagement between the stem 134 and the seal members 154 and 156 allows gradual reseating of the closure ball 158 against the end face of the seal member 156 and into the central passage 166 whereby to inhibit paint from splashing outwardly.

Referring to FIGS. 27(A) and 27(B), another preferred embodiment of the centrally bored quick disconnect stem 126 is shown connected and disconnected from the centrally bored quick disconnect connection 130. The centrally bored quick disconnect stem 126 in FIGS. 27(A) and 27(B) includes a closure member formed from a spherical ball 127 which freely moves between the pin 128 and a spherical rim or ledge 129 formed in the central bore 140 of the stem 134. Upon coupling the quick disconnect stem 126 to the quick disconnect connection 130, similarly to that shown in FIGS. 9(A)–9(C), pressure and fluid in the conduit upstream from the closure member 158 causes the spherical ball 127 to be displaced adjacent to the pin 128. Fluid then flows through the apertures 144 and into the central bore 140 of the elongated cylindrical stem 134 and passes between the spherical ball 127 and the spherical ledge 129, as shown in FIG. 27(A). The pressure downstream of the spherical ball 127 is thus substantially the same as the pressure upstream of the closure member 158 when the quick disconnect stem 126 is connected to the quick disconnect connection 130.

Referring to FIG. 27(B), upon disconnection of the quick disconnect stem 126 from the quick disconnect connection 130, the closure member 158 seals against the seal member 156 as previously discussed to inhibit flashback of fluid from the recirculating conduit. In addition, the pressure downstream from the spherical ball 127 and the quick disconnect stem 126 causes the spherical ball 127 to be moved into engagement with the spherical ledge 129 formed within the central bore 140 of the stem 134. Movement of the spherical ball 127 against the spherical ledge 129 seals the central bore 140 to inhibit any flashback of fluid from the quick disconnect stem 126 upon disconnection from the quick disconnect connection 130. Moreover, this also allows the spray gun 88 to be moved and stored without fluid leaking from the central bore 140 as long as a pressure is maintained upstream of the spherical ball 127. Upon connection of the quick disconnect stem 126 with the quick disconnect connection 130, the spherical ball 127 is moved away from the spherical ledge 129 since the pressure downstream of the spherical ball 127 is generally slightly less than upstream upon initial connection of the valve member 126 to the quick disconnect connection 130.

FIGS. 10, 11 and 12 disclose, respectively, details of the swivel fluid connector, the filter fluid connector and the restrictor valve. The swivel fluid connector 120 includes a body 180 having a bore extending between forward and rearward portions thereof, and a rotatable coupling nut 182 on the forward portion to couple to the quick disconnect fluid coupling assembly 118. The rearward portion is externally threaded and has an internal conical wall 184 to form a portion of a compression connection when connected to the filter fluid connector 122. Preferably, the body 180 is comprised of a suitable polymeric material, such as glass filled nylon with a ceramic. Desirably, the swivel fluid connector 120 allows the recirculating conduit 86 to rotate relative to the spray gun 88 and prevent forces from distorting the integrity of the recirculating conduit. Depending on the application, the coupling nut 182 may either be of a polymeric material, or metal, such as stainless steel.

The filter fluid connector 122 is similar to that disclosed in U.S. Pat. No. 4,442,003, the teachings of which are incorporated herein by reference. Generally, the filter fluid connector 122 includes a thimble-shaped filter element 186 which is captivated between first and second ferrules 188 and 190, the first ferrule 188 being externally threaded for attachment to the restrictor fluid connector 124 and the filter element being affixed to the second ferrule 190. Importantly, however, the ferrule 188 is comprised of glass filled nylon with a ceramic and the ferrule 190 is comprised of stainless steel.

The restrictor fluid connector 124 is similar to that disclosed in U.S. Pat. No. 4,106,699, the teachings of which are incorporated herein by reference, and also in the aforementioned U.S. Pat. No. 5,060,861. The restrictor fluid connector 124 includes a centrally bored fluid housing 192, a coupling nut 194 mounted to the forward end portion of the housing for attachment to the ferrule 190 of the filter fluid connector 122, and a flow plate 196 and adjustable flow restrictor 198 secured in the bore of the fluid housing 192. Importantly, however, the fluid housing 192 is comprised of glass filled nylon with a ceramic.

Figure 37:
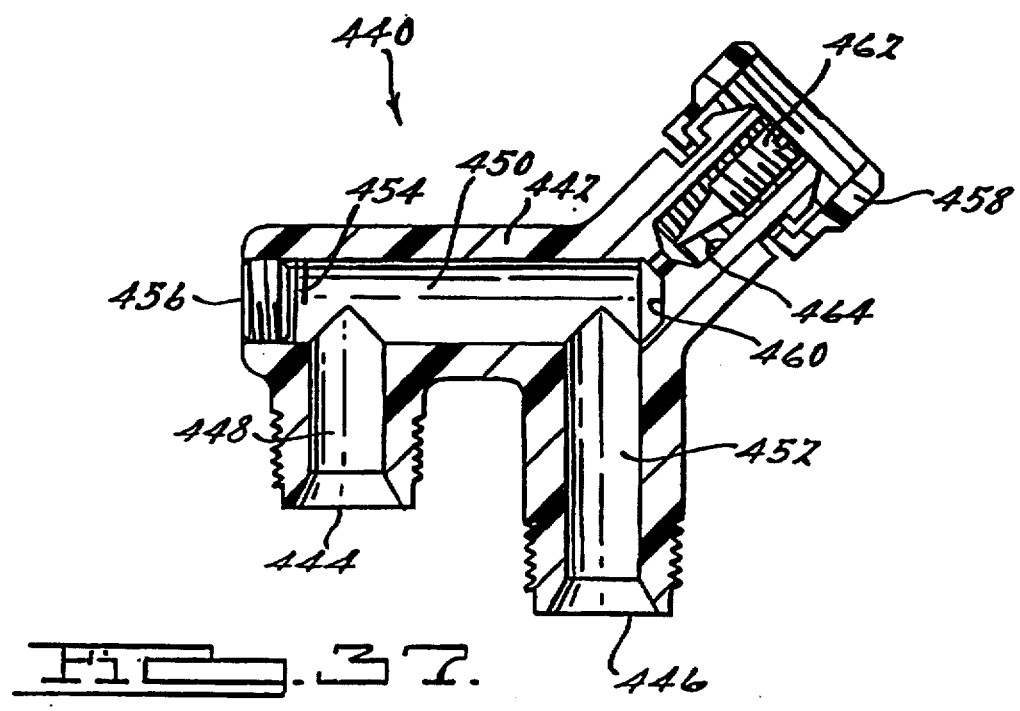
FIG. 37 is a cross-sectional view of another preferred embodiment of a restrictor fluid connector according to this invention.

Referring to FIG. 37, another embodiment of a restrictor fluid connector 440 is shown. The restrictor fluid connector 440 includes a molded one-piece body 442 having an externally threaded input port 446 and an externally threaded return port 444. The restrictor fluid connector 440 is used in place of the restrictor fluid connector 124 when a non-coaxial recirculating conduit 86 is used. In other words, a supply hose similar to hose 100 is coupled to the externally threaded input port 446 while a return hose similar to hose 102 is coupled to the externally threaded return port 444. The body 442 of the restrictor fluid connector 440 is a one-piece restrictor formed from a polymeric material such as glass filled nylon with a ceramic. The input port 446 connects to an input fluid passage 452 which flows into a central fluid passage 450 and the return port 444 includes a return fluid passage 448 which also flows from the central fluid passage 450. The central fluid passage 450 includes an internally threaded end portion 454 which receives a plug 456 after the fluid passage 450 is formed into the body 442. The restrictor fluid connector 442 is coupled to the ferrule 188 of the filter fluid connector 122, with a coupling nut 458 similar to the restrictor fluid connector 124.

The restrictor fluid connector 440 further includes a flow plate 460 and an adjustable flow restrictor 462 secured within a bore 464 of the body 442, similar to the restrictor fluid connector 124. By constructing the restrictor fluid connector 440 with a single body 442 comprised of a polymeric material, this eliminates the need to provide a restrictor fluid connector body formed from multiple parts which are welded together, such as when the restrictor fluid connector is comprised of stainless steel. This use of welded together multiple parts increases the overall production cost for such a restrictor, as well as potentially creates voids or crevices where the multiple parts are mated together which may accumulate paint over time and thereby flakes and particles get on the painted surface. Accordingly, the restrictor fluid connector 440 is therefor lower in cost to produce, lighter than conventional stainless steel restrictors and eliminates potential voids which can accumulate paint and dirt.

Figure 14:
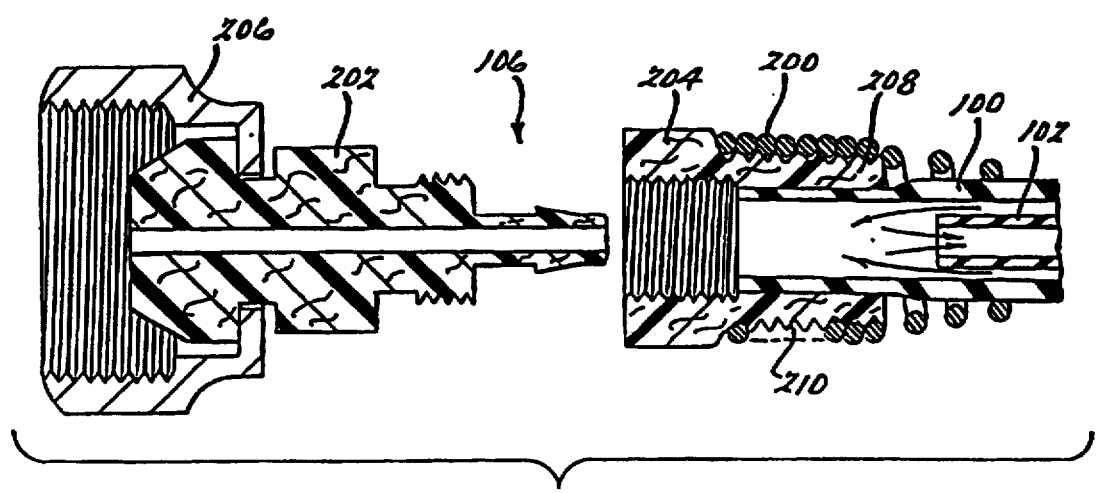
FIG. 14 is a partially exploded section view of the discharge end portion shown in FIG. 13 and illustrates a fluid connector that is terminated to the conduit and a spring guard that is secured to the fluid connector for supporting the conduit and the termination therefor according to this invention.

Turning to FIGS. 13 and 14, according to an important feature of this invention, the discharge end of the recirculating conduit 86 includes a flexible strain relieved termination, including the fluid fitting 106 that is terminated to the outer hose 100 of the recirculating conduit, and a helical coil sheath 200 to engage the fluid fitting and supportingly encircle the outer periphery of the recirculating conduit. Preferably, the fluid fitting 106 comprises a pair of fluid housings 202 and 204 which are threadably engaged to form the fitting. The fluid housing 202 includes a forward end portion onto which is mounted an internally threaded coupling nut 206 to connect to the restrictor fluid connector 124 and an externally threaded rearward end portion to threadably connect to the fluid housing 204. The fluid housing 204 includes a rearward end portion 208 to which the outer and inner supply and return hoses 100 and 102 of the recirculating conduit 86 are secured. Preferably the fluid housings 202 and 204 are comprised of glass filled nylon with a ceramic.

According to this invention, the rearward end portion 208 of the fluid housing 204 is externally threaded or formed to include helical convolutions 210 that extend radially outward therefrom with the sense of the convolutions (or thread) being opposite to the helical sense of the internal thread formed in the coupling nut 206. Further, according to this invention, the coil sheath 200 is formed by a wire that is helically coiled into an axially elongated cylinder and the helically coiled wire is threadably engaged within the grooves of the convolutions 210 formed on the fluid housing. As configured, coupling rotation of the coupling nut 206 on the fluid fitting 106 tends to tighten the threaded connection between the coils of the sheath and the helical grooves formed by the external thread.

Further, according to this invention, the forward end of the fluid fitting 106, enclosed by the coupling nut 206, is generally conically shaped. As such, the mated relation results in a compression fit.

FIGS. 15–17 illustrate preferred embodiments of a paint system according to this invention in which two paint coatings are applied at the same time. According to these embodiments a pair of respective coaxial recirculating conduits 86a and 86b are connected, respectively, at their supply end to a paint coating source to supply same under pressure to the discharge end of the conduit. For example, the first recirculating conduit 86a could recirculate a clear coat paint and the second recirculating conduit 86b could recirculate a base paint. A unique Y-shaped fluid connector 212 operates to receive the flow of paint composition from each of the two recirculating conduits, mix the flows into one, and supply this mixed flow to the spray gun 88.

Referring to FIG. 15, the Y-shaped fluid connector 212 includes two inlets 214, an outlet 216, a central chamber 218 for receiving the two coatings from the inlets 214, and a nylon mixing element 220 in the chamber for mixing the two coatings. A check valve 222 is positioned at each inlet to allow the base coat or clear coat to flow from the inlet to the outlet but not to flow into to other inlet. A slot 224 in the check valve 222 permits fluid to flow through the check valve when the fluid is being discharged from the recirculating conduit. The nylon mixing element 220 comprises a generally axial fin formed (i.e., twisted) helically about its axis. The fin rotates about its axis to mix the paints together as the clear coat and base coat are received in the chamber.

The recirculating conduits 86a and 86b preferably include a restrictor fluid connector 124, as described above. As shown in the paint system of FIG. 16, a single restrictor connector 124 is positioned at the outlet (i.e. discharge) end of the Y-shaped connector 212 whereby to restrict the flow of paint to the spray gun. Alternatively, as shown in the paint system of FIG. 17, two restrictor connectors 124 are provided, one for each inlet to the Y-shaped connector 212. The restrictor fluid connector 124 would advantageously permit the user to vary the amount of either paint composition being supplied to the mixer.

It is believed that the fluid connectors, which connect the paint supply to the conduits, need to have their inner components of stainless steel, although the outer shell still may be made of glass-filled nylon with a ceramic or metal. It is believed that making the components from stainless steel results in less degradation of the paint of those surfaces that contact the paint. Although not shown, it is to be understood that in certain applications the coaxial recirculating (i.e., the hose within a hose) conduit described above could be replaced with four separate conduits.

Referring now to FIGS. 18–23, according to another important feature of this invention, a paint flow regulator 226 for use in recirculating liquid coating composition systems is adapted to provide a specific flow of a single coating material to the spray gun 88. The flow regulator 226 assures a continuous supply of a uniform liquid coating to the nozzle of the spray gun 88 at an adjustable desired pressure.

The flow regulator 226 includes a first and second housing 228 and 230 having respective mating faces 232 and 234 and forming respective chambers 236 and 238, inlet and return lines 240 and 242 communicating with the chamber 236 formed in the housing 228, an outlet line 244 communicating with the mating face 232, a fluid passage 246 extending between the flow chamber 236 and the mating face 232, and a diaphragm 248 and a gasket 250, the housings being combinable whereby the outer periphery of the diaphragm 248 and the gasket 250 are compressed between the mating faces 232 and 234 and the diaphragm isolates the chambers 236 and 238 from one another. A series of fluid recesses 252 arranged into the shape of a crucifix are formed in the front mating face 232 with one fluid recess 252 thereof being in direct fluid communication with the outlet line 244. The crucifix has its center located on the passage 246 and the respective recesses extend radially outwardly from the axis of the passage. The inlet and return lines 240 and 242 terminate in a conventional fluid connector and the outlet line 244 terminates in a conventional quick connect fluid connector.

Flow is regulated, in part, by an elastomeric seal 254 having a through bore 256 and mounted in the flow chamber 236 for sealing the entrance to the passage 246 and an axial push rod 258 mounted for axial movement in the bore 256 and in the passage 246. The push rod 258 has a shaped head 260 disposed in the flow chamber 236 and movable into sealing engagement with the wall of the through bore 256, a drive shoulder 262 positionable in the passage adjacent to the mating face 232, and a threaded forward end 264 extending through the diaphragm 248 and into the chamber 238. The cross-section of the drive shoulder 262 and the passage 246 adjacent the front mating face 232 are substantially the same whereby the drive shoulder 262 will inhibit flow from the flow chamber 236. Access to the flow chamber 236 is afforded by a plug 266 threadably secured in a bore formed in the housing 228.

Preferably the housings 228 and 230 and the plug 266 are comprised of a polymeric material, such as glass filled nylon with a ceramic. To form a complementary transition between the polymeric material of the housing 228 and to transmit force, flat annular washers 268 and 270 are located between the mating face 232 and the diaphragm 248, the washer 268 being of polymeric material and abutted against the mating face 232 and the washer 270 being of a suitable metal and abutted against the diaphragm.

Movement of the push rod 258 is controlled, in part, by a flat circular force plate 272 disposed in the chamber 238, an axial flow control plunger 274 extending through a wall of the housing 230 into the chamber 238 to engage the force plate 272, a flat polymeric annular washer 276 in the chamber 238 and abutted against the diaphragm 248, and a cylindrical coil spring 278. The coil spring 278 is comprised of flat coils and has its opposite axial ends abutted, respectively, against the annular washer 276 and the force plate 272. The forward end 264 of the push rod 258 is provided with a cap 280 which engages the washer 276, the cap 280 and the drive shoulder 262 operating to clamp the washers 268, 270 and 276 and the diaphragm 248 together. The flow control plunger 274 is threadably engaged with the housing 230 and adapted to be incrementally advanced into and outward of the chamber 238, the inward advance of the flow control plunger 274 increasing the spring force acting on the washer 276 (and thus the fluid pressure needed to overcome the spring load).

The operation of the flow regulator 226 is shown in sequence in FIGS. 20–22. Fluid flow is regulated through the flow regulator 226 by the axial reciprocation of the push rod 258 within the passage 246. During operation, the flow chamber 236 continuously receives and recirculates a high volume of liquid paint whereby to maintain the liquid constituents therein in the form of a substantially uniform dispersion. The paint is introduced into the flow chamber 236 through one sidewall of the flow chamber such that the paint will impinge on an apertured turbulizer sleeve 267 extending from the plug 266 and against an opposite sidewall to develop a swirling action to maintain the paint constituents uniformly dispersed.

Initially, as shown in FIG. 20, the coil spring 278 normally biases the polymeric washer 268 against the mating face 232, thereby resulting in the washer 268 forcing the drive shoulder 262 of the push rod 258 into position in closing relation with the outlet of the passage 246. Pressurized liquid is then introduced into the flow chamber 236 via the inlet line 240. If the fluid pressure is lower than the spring force, the driver shoulder 262 will not move but will act to prevent fluid from flowing through the passage 246. The fluid will return to the supply via the return line 242.

As shown in FIG. 21, as the fluid pressure increases, the force acting on the head 260 of the push rod 258 will exceed the spring force, thereby driving the drive shoulder 262 of the push rod towards the second housing 230 and the washer 268 from covering relation against the mating face 232 and with the recesses 252. Fluid is allowed to communicate via the recess 252a and to the outlet line 244. Excess fluid will return to the supply via the return line 242.

Finally, as shown in FIG. 22 should the pressure increase to a level that the fluid force acting on the head 260 is greater than the spring force, the head 260 will move into seated relation with the wall of the through bore 256 of the seal 254 mounted in the fluid chamber 236. In this condition, the push rod 258 will prevent fluid from passing through the passage 246 and the fluid will return to the supply via the return line 242.

Figure 24:
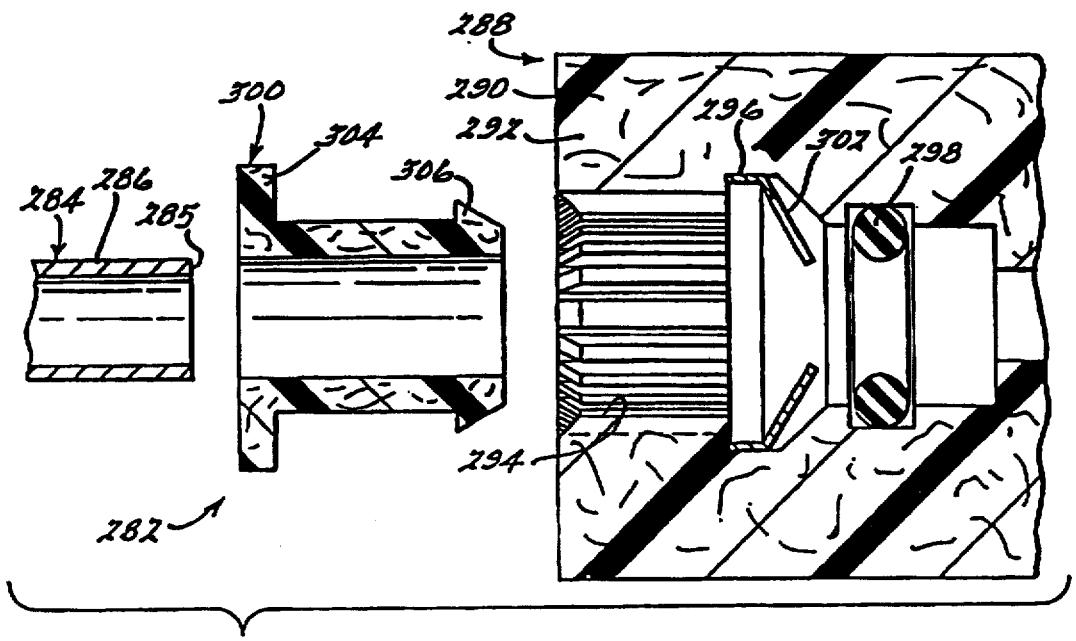
FIGS. 24–26 are views of a push to connect fluid coupling including a compression seal for a recirculating paint system according to this invention.
Figure 25:
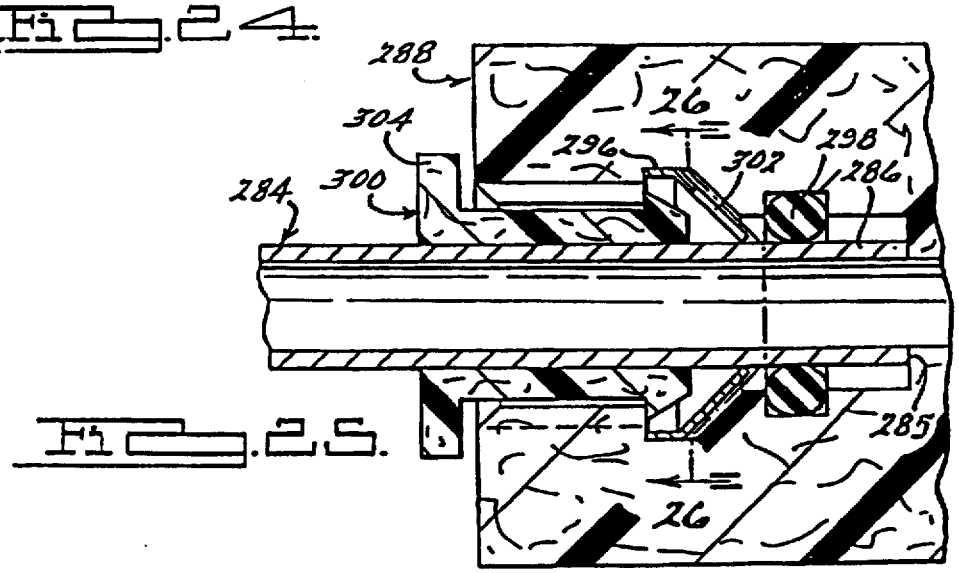
Figure 26:
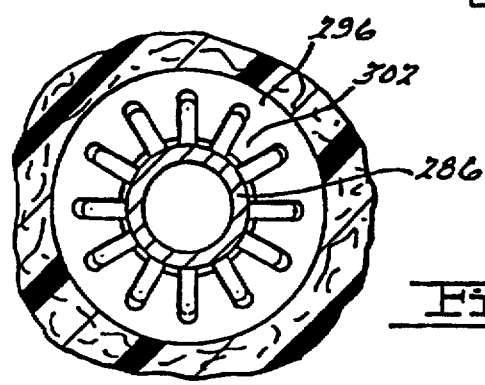

According to another feature of this invention, a push to connect fluid coupling 282 is shown in FIGS. 24–25. In this fluid coupling, a cylindrical fluid conduit 284 has an end portion 286 adapted to be inserted into a fluid connector 288, whereby to be simultaneously releasably gripped, axially positioned and sealed. As shown, the fluid connector 288 comprises a housing 290 having an annular shoulder 292 leading into a stepped bore 294, an annular lock ring 296 and an annular O-ring 298 located in the bore 294, and a tubular unlock sleeve 300 mounted to the shoulder. The lock ring 296 and the O-ring 298 are mounted in respective annular grooves formed in the stepped bore 294 and each operates to radially engage the outer periphery of the conduit 284 to inhibit its unwanted release. The lock ring 296 has a plurality of radially inwardly directed spring tines 302 which are adapted to engage the end portion 286 and lock the conduit 284 in the bore 294. The tines 302 deflect radially outwardly upon engagement with the fluid conduit 284 and direct the end portion 286 towards the O-ring 298 and the end 285 of the conduit towards an endwall of the bore 294. The unlock sleeve 300 includes a pair of axially spaced collars 304 and 306 which engage opposite axial faces of the annular shoulder 292, the collars being axially spaced to permit axial captivated movement of the unlock sleeve 300 relative to the housing 290.

To effectuate release, the unlock sleeve 300 is forced axially inwardly of the stepped bore 294 whereby the conical end face of the collar 306 engages and drives the spring tines 302 radially outwardly. The collar 304 prevents excess inward axial movement of the unlock sleeve 300 into the stepped bore, such movement as could overstress the spring tines 302, or possibly cause the collar 306 to be locked between the O-ring 298 and the deflectable ends of the tines 302. In this regard, the wall between the annular groove receiving the lock ring 296 and the O-ring 298 is tapered and serves to support the tines 302 during their deflection.

Referring to FIGS. 30–33, the improved spray gun 88 according to this invention is shown. The spray gun 88 includes a body 310 comprised of a polymeric or composite material which is preferably a glass-filled nylon with a ceramic known as Esbrid, having a preferable Grade NSG440A or LSG440A with a color code of 70030 from Thermofil of Brighton, Mich. This composite enable s the body 310 to be formed from injection molding and have a tensile strength of about 30,000 pounds. This provides an improved spray gun 88 which is both durable and light. For example, the improved spray gun 88 weighs about 10 ounces versus about 22 ounces for a conventional spray gun made from aluminum. The body 310 includes a handle portion 312, a head or baffle portion 314 and a neck portion 316. The neck portion 316 includes a curved hook 318 which may be used to hang the spray gun 88. The handle 312 defines a pair of cut-out regions 320 located on opposite sides of the handle 312 which eliminate unnecessary material and ultimately reduces the overall weigh t of the spray gun 88. Cover plates (not shown) may be used to cover the cut-out regions 320 for aesthetic purposes and identification.

The head or baffle portion 314, which can be clearly seen in FIG. 33, includes an enlarged conical portion 322. The enlarged conical portion 322 defines multiple enlarged air passages 324 to direct high pressure air out of the spray gun 88 for use in atomization of the paint, which will be discussed in detail shortly. Secured to the head 314 of the spray gun 88 is an air cap or spray atomizer 326 which is removably and sealably seated relative to the head 314, via a air cap retaining ring 328 and an air baffle (not shown). The air cap 326 and the air cap retaining ring 328 are preferably constructed of a polymeric material, such as Delrin and the air baffle is constructed of aluminum which is fixedly mounted to the head 314. Moreover, the air cap 326, the retaining ring 328 and the air baffle have a conventional configuration as is known to those skilled in the art.

In order for the air cap 326 to atomize the paint supplied by the recirculating liquid paint coating composition supply system 10, the air cap 326 includes a plurality of air holes 330 located about a fluid tip 332 and within air horns 334. The air holes 330 direct high pressure air which is supplied to the gun 88, via a threaded air connection inlet connector 336, to control the spray pattern of the paint using conventional techniques known in the art. The compressed air has a pressure of about 70–100 psi and is supplied from a conventional compressed air source with an air hose (not shown) that is removably coupled to the air connection inlet connector 336.

Referring to the cross-section view of the body 310 of the spray gun 88, the air is first supplied or directed to an enlarged cylindrical tapered air passage 338 having a threaded end 340 for receiving the air connection inlet connector 336. The air passage 338 is defined by the handle 312 and has an opening diameter 342 of about 0.392 inches which tapers to an exit opening 344 of about 0.340 inches. In contrast, conventional spray guns typically utilize a non-tapered cylindrical air passage having a diameter of about 0.25 inches. The larger tapered air passage 338 thus allows more volume of air to pass through the spray gun 88 which provides for better atomization at any pressure.

A valve chamber 346, defined by the handle 312, threadably secures a conventional air valve assembly 348, partially shown in FIG. 30, via threads 350. Air is directed or passes from the air passage 338 into the valve chamber 346 through the air valve assembly 348. The air valve assembly 348 within the chamber 346, is controlled, via an air valve 352, connected to a trigger 354. The trigger 354 is preferably constructed of metal and is pivotably secured to the neck 316, via a trigger bearing and stud 356. Upon actuation of the air valve assembly 348, via the trigger 354, air passes through the air valve assembly 348 and into and through an adjacent chamber 358, via a cylindrical tapered passage 360, having a center diameter of about 0.26 inches. The chamber 358 also being defined by the handle 312.

A conventional fluid needle assembly 362, partially shown in FIG. 30, is threadably secured within the chamber 358, via a threaded coupling nut 364 and threads 366. The fluid needle assembly 362 always allows air to pass through the chamber 358 and also controls the amount of movement of the trigger 354 upon axially rotating a fluid adjustment knob 368. The coupling nut 364 and the fluid adjustment knob 368 are preferably constructed of a polymeric material, such as Delrin. Upon axially rotating the fluid adjustment knob 368, adjustment of the fluid flow out of the fluid tip 332 is made. In other words, the fluid adjustment knob 368 adjusts or controls the amount the trigger 354 travels.

The air flow from the chamber 358 continues through a tapered cylindrical passage 370 having a center diameter of about 0.28 inches. It should be noted that the tapered cylindrical passages 360 and 370 are concentric with one another and essentially consists of a single tapered passage 372 which has an opening diameter 374 of about 0.353 inches and an ending diameter 376 of about 0.250 inches. Once the passage 372 is formed, a plug 378 is used to seal the top portion of the passage 372.

The air from the passage 370 is directed to and enters a cylindrical tapered passage 380 of the neck 316 which threadably secures a conventional spreader adjustment valve or air adjustment needle (not shown). The air adjustment needle is connected to a threaded air flow knob 382. The threaded air flow knob 382 threadably engages a coupling nut 384 which is secured within threads 386. The spreader adjustment valve controls the spray pattern of the fluid out of the fluid tip 332 by axially extending or retracting the air adjustment needle within the tapered passage 380 in order to control the flow of air out of the air holes in the air horns 334. The air adjustment needle, the coupling nut 384 and the air flow knob 382 are also preferably constructed of a polymeric material, such as Delrin.

As the air passes downstream in the passage 380, it enters or is directed to the head portion or baffle 314. Upon entering the head portion 314, the airflow is divided into the three enlarged passages 324, shown clearly in FIGS. 32 and 33. The enlarged conical portion 322 is substantially larger than conventional heads which are typically about half the size of the conical portion 322. This enables the air passages 324 to have an enlarged diameter of about 0.200 inches versus a conventional diameter of about 0.156 inches. This further enables a greater volume of air to pass through and out of the head 314 and into the conventional air baffle (not shown), providing even greater atomization. From the air passages 324, the air circulates about an annular channel 382 prior to exiting through the baffle and air holes 330 in the air cap 326.

The recirculating paint is supplied, via the recirculating conduit 86, which is coupled to a threaded connector 384, via the fluid fitting assembly 108. The connector 384 is threadably connected to the body 310 by threads 386. Upon actuating the trigger 354, a fluid needle 388 which seals the fluid tip 332 axially moves in and out to enable the paint to pass from the recirculating conduit 86 through a chamber 390, defined by the head 314, and out the fluid tip 332. Upon exiting the fluid tip 332, the combination of the paint with the directional air supplied about the air cap 326 creates and directs an elliptical spray pattern to the object to be coated or painted. The construction of the fluid needle 388 within the chamber 390 is of a conventional nature known to those skilled in the art.

By coupling the conduit 86 to the head 314, via the chamber 390, this enables the spray gun 88 to be used with various distinct fluid coatings without the need to flush out the spray gun 88. In other words, the spray gun 88 can be quick disconnected at the fluid fitting assembly 108 and coupled to a new conduit 86 in order to apply a new liquid coating composition. For example, different color paints can simply be applied using only the single spray gun 88 because the paint exits the spray gun 88 substantially where it enters the spray gun 88 (i.e. the chamber 390). This is in contrast to certain other existing spray guns which supply the paint through the handle, thereby causing larger amounts of paint to remain in the spray gun at all times, thus requiring the spray gun to be flushed out before a different color paint can be applied. For instance, the spray gun 88 will retain less than 2 cubic centimeters of paint in the chamber 390, while a spray gun in which the paint is supplied through the handle will retain over 20 cubic centimeters of paint throughout the entire gun. Moreover, this inhibits the paint within the gun from being recirculated.

By providing a polymeric composite spray gun 88 having a substantially reduced weight versus conventional metal spray guns, operator fatigue is greatly reduced while finish quality is greatly increased over time. Moreover, the use of the lighter more durable spray gun 88 further reduces the chance of an operator developing any medical ailments which may be developed by continuous and repetitive use of the heavier metal spray guns. Additionally, the use of larger flow passages 338 and 324, enables a higher volume of air to pass through the spray gun 88, thereby providing better atomization of the paint, as well as improved finish quality.

While the above description constitutes the preferred embodiment of the invention, it will be appreciated that the invention is susceptible to modification, variation, and change without departing from the proper scope or fair meaning of the accompanying claims.

I claim:

1. A lightweight spray gun for a paint supply system, said system comprising:

a supply conduit for supplying a liquid coating composition to said spray gun;

an air line for supplying pressured air to said spray gun; and said lightweight spray gun including, a head for directing said liquid coating composition received at said head and said pressurized air received at a handle out of said spray gun, said head having a plurality of air passages and an outwardly tapering portion, a neck for directing said pressurized air to said head, and said handle in communication with said air line which defines an air passage for directing said pressurized air to said neck, wherein said head, said neck, and said handle are each comprised of a polymeric material to substantially reduce the overall weight of said spray gun.

2. The spray gun for the recirculating paint supply system as defined in claim 1 wherein said head further includes an atomizer having a plurality of air holes for directing said pressurized air.

3. The spray gun for the recirculating paint supply system as defined in claim 1 wherein said neck defines a tapered cylindrical air passage for directing said pressurized air to said head.

4. The spray gun for the recirculating paint supply system as defined in claim 1 wherein said handle includes at least one cut-out region which reduces the overall weight of said spray gun.

5. The spray gun for the recirculating paint supply system as defined in claim 1 wherein said air passage defined by said handle is a tapered cylindrical air passage having an entrance opening diameter of about 0.392 inches and an exit opening diameter of about 0.340 inches.

6. The spray gun for the recirculating paint supply system as defined in claim 1 wherein said polymeric material includes glass filled nylon.

7. The spray gun for the paint supply system as defined in claim 6 wherein said polymeric material is a glass filled nylon with ceramic material.

8. The spray gun for the recirculating paint supply system as defined in claim 1 wherein receiving said liquid coating composition at said head enables said spray gun to be removably coupled to a new supply conduit and a new return conduit having a new liquid coating composition without the need for flushing out said spray gun prior to coupling to said new supply conduit and said new return conduit.

9. A spray gun for a recirculating paint supply system, said system comprising:

a supply conduit for supplying a liquid coating composition received from a supply to said spray gun;

a return conduit for returning excess liquid coating composition supplied to said spray gun to said supply;

an air line for supplying pressured air to said spray gun; and said spray gun including, a head for directing said liquid coating composition received at said head and said pressurized air received at a handle out of said spray gun, wherein said head is an enlarged conical head which defines a plurality of air passages, a neck for directing said pressurized air to said head, and said handle coupled to said air line which defines an air passage for directing said pressurized air to said neck, wherein said head, said neck, and said handle are each comprised of a polymeric material to substantially reduce the overall weight of said spray gun.

10. The spray gun for the recirculating paint supply system as defined in claim 9 wherein said plurality of air passages includes three cylindrical air passages each having a diameter of about 0.2 inches.

11. A body of a spray gun for a recirculating paint supply system, said body comprising:

a head having an enlarged conical portion defining a plurality of first air passages;

a neck defining a second air passage coupled to said plurality of first air passages; and a handle defining a third tapered cylindrical air passage having an entrance opening diameter of about 0.39 inches and an exit opening diameter of about 0.34 inches, wherein a greater volume of compressed air passes through said third tapered cylindrical air passage to provide substantially greater atomization of a liquid coating composition out of said head.

12. The body of the spray gun as defined in claim 11 further comprising a first chamber defined by said handle and coupled to said third tapered cylindrical air passage and a second chamber defined by said handle and positioned between said first chamber and said second air passage, said second air passage and said first and second chambers defining a portion of a fourth tapered cylindrical air passage extending therethrough.

13. The body of the spray gun as defined in claim 12 further comprising a plug for sealing one end of said fourth tapered cylindrical air passage.

14. The body of the spray gun as defined in claim 11 wherein said body is comprised of a polymeric material.

15. The body of the spray gun as defined in claim 14 wherein said polymeric material includes glass-filled nylon.

16. The body of the spray gun as defined in claim 14 wherein said polymeric material includes a glass-filled nylon with ceramic material.

17. The body of the spray gun as defined in claim 11 wherein said plurality of first air passages includes three cylindrical air passages each having a diameter of about 0.2 inches.

18. A paint supply system comprising:

a first supply conduit for supplying a first liquid coating composition to a spray gun;

a first quick-disconnect assembly in fluid communication with said first supply conduit and said spray gun;

an air line for supplying pressurized air to said spray gun; and said spray gun including, a head in fluid communication with said first supply conduit and said first quick-disconnect assembly for directing said first liquid coating composition and said pressurized air out of said spray gun, said head having a plurality of air passages and an outwardly tapering portion, a neck for directing said pressurized air to said head, and a handle in communication with said air line which defines an air passage for directing said pressurized air to said neck, wherein said head, said neck and said handle are comprised of a polymeric material and said spray gun may be quickly fluidly disconnected from said first supply conduit with said first quick-disconnect assembly and fluidly coupled to a second supply conduit with a second quick-disconnect assembly to deliver a second liquid coating composition.

19. The paint supply system as defined in claim 18 wherein said plurality of cylindrical air passages defined by said head each have a diameter of about 0.2 inches and wherein said air passage defined by said handle is a tapered cylindrical air passage having an entrance opening diameter of about 0.39 inches and an exit opening diameter of about 0.34 inches.

20. The recirculating paint supply system as defined in claim 18 further comprising a swivel fluid connector in fluid communication with said first quick-disconnect assembly.

21. The recirculating paint supply system as defined in claim 18 further comprising a filter fluid connector in fluid communication with said first quick-disconnect assembly.

22. The recirculating paint supply system as defined in claim 18 further comprising a restrictor fluid connector in fluid communication with said first quick disconnect assembly.

23. The recirculating paint supply system as defined in claim 18 wherein said first supply conduit and first return conduit forms a co-axially arranged first recirculating conduit.

24. The recirculating paint supply system as defined in claim 23 further comprising a helical coil sheath operable to encircle a portion of said first recirculating conduit.

25. The recirculating paint supply system as defined in claim 23 further comprising a Y-shaped fluid connector fluidly coupled to each of said first quick disconnect assembly, said first recirculating conduit and a second recirculating conduit for mixing said first liquid coating composition from said first recirculating conduit with said second liquid coating composition from said second recirculating conduit.

26. The recirculating paint supply system as defined in claim 18 further comprising a paint flow regulator in fluid communication with said first supply conduit and said first return conduit.

27. The recirculating paint supply system as defined in claim 18 further comprising an H-shaped fluid connector assembly fluidly coupled to said first supply conduit and said first return conduit for interrupting the supply of said first liquid coating composition to said spray gun.

28. The recirculating paint supply system as defined in claim 27 wherein said H-shaped fluid connector assembly includes a plurality of ball valves.

29. The recirculating paint supply system as defined in claim 18 further comprising a supply line fluidly coupled to said first supply conduit for supplying said first liquid coating composition to said first supply conduit, said supply line including a ball valve for inhibiting the flow of said first liquid coating composition to said first supply conduit.

30. The recirculating paint supply system as defined in claim 29 further comprising a Y-shaped fluid fitting fluidly coupled to said supply line.

31. A paint supply system, said system comprising;

a supply conduit for supplying a liquid coating composition to a spray gun;

an air line for supplying pressured air to said spray gun;

an encapsulated ball valve in fluid communication with said supply conduit, said encapsulated ball valve including a rotatable ball and a pair of valve seats adapted to be brought into abutting relation with said rotatable ball to substantially encapsulate said rotatable ball; and said spray gun including, a head for directing said liquid coating composition received at said head and said pressurized air received at said handle out of said spray gun, said head having a plurality of air passages and an outwardly tapering portion, a neck for directing said pressurized air to said head, and a handle in communication with said air line which defines an air passage for directing said pressurized air to said neck, wherein said head, said neck, and said handle are each comprised of a polymeric material to reduce the overall weight of said spray gun.

* * * * *